United States Patent
Chai

(10) Patent No.: US 10,609,225 B2
(45) Date of Patent: Mar. 31, 2020

(54) CHARGING METHOD, APPARATUS, AND SYSTEM

(71) Applicant: Huawei Technologies Co., Ltd., Shenzhen (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/352,685

(22) Filed: Mar. 13, 2019

(65) Prior Publication Data

US 2019/0215403 A1 Jul. 11, 2019

Related U.S. Application Data

(63) Continuation of application No. PCT/CN2017/091219, filed on Jun. 30, 2017.

(30) Foreign Application Priority Data

Sep. 14, 2016 (CN) .......................... 2016 1 0826665
Sep. 21, 2016 (CN) .......................... 2016 1 0839333

(51) Int. Cl.
H04M 15/00 (2006.01)
H04W 4/24 (2018.01)
H04L 12/14 (2006.01)

(52) U.S. Cl.
CPC ............ *H04M 15/66* (2013.01); *H04L 12/14* (2013.01); *H04L 12/1407* (2013.01);
(Continued)

(58) Field of Classification Search
CPC .. H04M 15/66; H04M 15/785; H04M 15/852; H04M 15/853; H04M 15/854;
(Continued)

(56) References Cited

U.S. PATENT DOCUMENTS

2012/0117235 A1 5/2012 Castro Castro et al.
2013/0091281 A1* 4/2013 Chai .................... H04L 12/14
709/225
(Continued)

FOREIGN PATENT DOCUMENTS

CN 101316175 A 12/2008
CN 104012039 A 8/2014
(Continued)

OTHER PUBLICATIONS

3rd Generation Partnership Project;Technical Specification Group Services and System Aspects; Architecture enhancements for control and user plane separation of EPC nodes; Stage 2 (Release 14), 3GPP TS 23.214 V0.1.0, Jul. 2016, 33 pages.

*Primary Examiner* — Minjung Kim
(74) *Attorney, Agent, or Firm* — Slater Matsil, LLP

(57) ABSTRACT

A charging method applied to a network architecture in which network control and data flow forwarding are separated. The method includes receiving, by a control plane (CP) entity, a charging rule delivered by a policy and charging rules function PCRF entity, generating, by the CP, a user plane UP entity reporting policy based on the charging rule, requesting, by the CP from an online charging system OCS, a quota required by a rating group in the charging rule; receiving, by the CP, a quota delivered by the OCS, and generating UP quota information based on the quota; and delivering, by the CP, the generated UP reporting policy and the generated UP quota information to the UP.

25 Claims, 9 Drawing Sheets

(52) U.S. Cl.
CPC ........... *H04M 15/64* (2013.01); *H04M 15/65* (2013.01); *H04M 15/785* (2013.01); *H04M 15/852* (2013.01); *H04M 15/853* (2013.01); *H04M 15/854* (2013.01); *H04W 4/24* (2013.01)

(58) Field of Classification Search
CPC ....... H04M 15/64; H04M 15/65; H04W 4/24; H04L 12/1407; H04L 12/14; H04L 12/141
See application file for complete search history.

(56) References Cited

U.S. PATENT DOCUMENTS

| | | | |
|---|---|---|---|
| 2014/0040975 A1* | 2/2014 | Raleigh | H04W 12/12 726/1 |
| 2014/0056182 A1* | 2/2014 | Chai | H04L 12/14 370/259 |
| 2015/0222442 A1 | 8/2015 | Baer et al. | |
| 2015/0319315 A1* | 11/2015 | Chai | H04L 12/1407 455/406 |
| 2016/0174055 A1 | 6/2016 | Wang et al. | |

FOREIGN PATENT DOCUMENTS

| | | | | |
|---|---|---|---|---|
| CN | 104639340 A | 5/2015 | | |
| CN | 105515793 A | 4/2016 | | |
| EP | 2975869 A1 | 1/2016 | | |
| WO | WO-2014110719 A1 * | 7/2014 | ......... | H04L 12/1407 |
| WO | 2014169877 A1 | 10/2014 | | |

\* cited by examiner

CHARGING METHOD, APPARATUS, AND SYSTEM

CROSS-REFERENCE TO RELATED APPLICATIONS

This application is a continuation of International Application No. PCT/CN2017/091219, filed on Jun. 30, 2017, which claims priority to Chinese Patent Application No. 201610839333.2, filed on Sep. 21, 2016, and Chinese Patent Application No. 201610826665.7, filed on Sep. 14, 2016, all of which are hereby incorporated by reference in their entireties.

TECHNICAL FIELD

The present disclosure relates to the field of communications technologies, and specifically, to a charging method, a charging apparatus, and a charging system that are applied to a network architecture in which control and data flow forwarding are separated.

BACKGROUND

The 3rd Generation Partnership Project (3GPP) defines an architectural of a policy and charging control (PCC) framework. The PCC framework includes: a policy and charging rules function (PCRF) entity, a policy and charging enforcement function (PCEF) entity, an online charging system (OCS), and the like. The PCRF is mainly configured to determine a PCC rule for a user, and send the determined PCC rule to the policy and charging enforcement function (PCEF) entity. The PCEF is usually implemented based on a gateway and may be connected to a plurality of access networks.

Currently, a basic online charging mechanism is as follows: A charging trigger function (CTF) in a gateway completes quota application, quota management, and quota usage monitoring, performs a charging collection function, and detects, on the gateway, whether conditions for all trigger events/conditions (for example, a user location change or a quality of service (QoS) change) are met. A PCEF located in a gateway apparatus applies, by using rating group information, to an OCS for reservation of credit authorization, and reports, under a specific condition, collected service information to a charging system. The OCS deducts fees based on the reported service usage information.

In an existing network architecture, a data gateway (for example, a PDN Gateway (PGW)) is located in an excessively high position. To be specific, to cooperate in charging, cooperate with the PCRF, and the like, data gateways need to be centrally deployed at a relatively long distance from an access network, in other words, at a relatively long distance from a user. Consequently, each data packet has to be transmitted for an extremely long distance in a network before the data packet is forwarded for processing. In this case, 3GPP puts forward an idea that a control plane and a user plane (Control plane and User plane (CU), also referred to as a data plane) are separated. To be specific, data gateways are classified into a user plane and a control plane for separate deployment. Specifically, user plane gateways (UGW) may be deployed in a distributed manner, and may be moved downwards to a place at a relatively low position as compared with a conventional gateway (located in a relatively high position), for example, close to a Radio Access Network (RAN). Entity-to-entity (E2E) user plane transmission of some local services (whose server is a local server) may all be performed locally without passing through a backbone network, thereby reducing a lot of transmission delays. In addition, control plane gateways are still centrally deployed. The gateways herein may be PGWs in a fourth generation (4G) core network, or may be data gateways in a fifth generation (5G) core network.

In the prior art, in the architecture in which network control and data flow forwarding are separated, a charging enforcement function cannot be performed at one point. For example, because trigger conditions are distributed to a control plane entity and a user plane entity in a network, quota application, quota management, data flow information collection and the like cannot be performed at one point. Consequently, charging is performed at coordinated multi-points.

Therefore, in an existing charging mechanism and an existing charging solution, online credit control cannot be performed in the architecture in which network control and data flow forwarding are separated.

SUMMARY

Embodiments of the present disclosure provide a charging method, a charging apparatus, and a charging system, to resolve a problem that in an existing charging mechanism and an existing charging solution, online credit control cannot be performed in an architecture in which network control and data flow forwarding are separated.

According to a first aspect, an embodiment of the present disclosure provides a charging method. The charging method is applied to a network architecture in which network control and data flow forwarding are separated, and includes: executing, by a control plane (CP) entity, a charging rule installed or activated by a policy and charging rules function PCRF entity, generating, by the CP, a user plane (UP) entity reporting policy based on the charging rule, requesting, by the CP, a required quota from an online charging system (OCS) based on the charging rule, receiving, by the CP, a quota delivered by the OCS, and generating UP quota information based on the quota, and establishing, by the CP, an association relationship between the UP reporting policy and the UP quota information, including, in the UP reporting policy and/or the UP quota information, a parameter that indicates the association relationship, and delivering the UP reporting policy and/or the UP quota information to the UP.

In a possible design, if the quota delivered by the OCS is a quota allocated for a rating group in one or more charging rules, the CP associates the UP quota information corresponding to the quota delivered by the OCS with UP reporting policies corresponding to the one or more charging rules, or if the quota delivered by the OCS is a quota allocated for a rating group and a service identifier in one or more charging rules, the CP associates the UP quota information corresponding to the quota delivered by the OCS with UP reporting policies corresponding to the one or more charging rules. The including, in the UP reporting policy and/or the UP quota information, a parameter that indicates the association relationship specifically includes: including a used UP quota ID in the UP reporting policy, including a corresponding UP reporting policy identifier in the UP quota information, or including a used UP quota ID in the UP reporting policy, and including a corresponding UP reporting policy identifier in the UP quota information.

In a possible design, the CP generates a corresponding UP reporting policy for the charging rule, where the UP reporting policy includes one or more of the following: the reporting policy ID, a flow feature and/or an application ID in the charging rule, precedence of the UP reporting policy, a CP subscription event, an indication for use of UP quota information, or the used UP quota ID, and the CP saves a correspondence between the charging rule and the UP reporting policy.

In a possible design, the receiving, by the CP, a quota delivered by the OCS, and generating UP quota information based on the quota delivered by the OCS includes: correspondingly generating, by the CP, UP quota information for each quota delivered by the OCS, where the UP quota information includes one or more of the following: a quota ID, a quota type, a quota value, one or more user plane trigger events corresponding to a quota, or a corresponding UP reporting policy identifier, and saving, by the CP, a correspondence between the UP quota ID and the quota delivered by the OCS.

In a possible design, the quota delivered by the OCS includes a time division point or an event division point, and the UP quota information further includes one or more statistics collection division points, so that the UP can use the quota, collect statistics about usage information, and report the usage information, based on the division point differentially.

In a possible design, the method includes: determining whether the quota delivered by the OCS is a single quota or a quota pool, and if it is determined that the quota delivered by the OCS is a single quota, generating, by the CP, UP quota information for each rating group in the charging rule, where UP reporting policy identifiers included in the UP quota information are all UP reporting policies corresponding to one or more charging rules corresponding to the rating group, or if it is determined that the quota delivered by the OCS is a quota pool, generating, by the CP, UP quota information for all rating groups in the quota pool, where UP reporting policy identifiers included in the UP quota information are all UP reporting policies corresponding to all charging rules corresponding to all the rating groups in the quota pool.

In a possible design, after generating the UP reporting policy or the UP quota information, the CP separately delivers the generated UP reporting policy or the generated UP quota information, where the UP reporting policy or the UP quota information is associated with currently existing UP quota information or a currently existing UP reporting policy of the UP, or is not associated with any currently existing UP quota information or any currently existing UP reporting policy of the UP, or the CP simultaneously delivers the generated UP reporting policy and the generated UP quota information to the UP.

In a possible design, before the receiving, by the CP, a quota delivered by the OCS, and generating UP quota information based on the quota, the method further includes: determining, by the CP based on a CCA message returned by the OCS, whether to deliver quota information to the UP, and specifically, if the quota delivered by the OCS is 0, or an error message is returned in the CCA, not delivering the quota information to the UP, or if the CP can manage usage of the quota, not delivering the quota information to the UP.

In a possible design, before the requesting, by the CP from an online charging system OCS, a quota required by a rating group in the charging rule, the method further includes: determining, by the CP, whether there is an available quota for the rating group in the charging rule, and if there is no available quota, requesting, by the CP from the OCS, the quota required by the rating group in the charging rule, if there is an available quota and the charging rule has a corresponding UP reporting policy, modifying, by the CP, the UP reporting policy based on the charging rule, and delivering an updated UP reporting policy to the UP, or if there is an available quota but the charging rule does not have a corresponding UP reporting policy, generating, by the CP, a new UP reporting policy for the charging rule, and delivering the new UP reporting policy to the UP, or generating, by the CP, a new UP reporting policy for the charging rule, generating updated UP quota information for UP quota information corresponding to the rating group in the charging rule, and delivering the new UP reporting policy and the updated UP quota information to the UP, where the updated UP quota information includes the new UP reporting policy.

In a possible design, the CP receives quota usage information reported by the UP, and generates a charging report message CCR based on the saved correspondence between the UP quota ID and the quota delivered by the OCS, where the CCR includes: a rating group of the quota, quota usage information corresponding to each UP reporting policy ID, information about the control plane entity, a trigger met by the CP, and/or a trigger met by the UP.

In a possible design, the receiving, by the CP, quota usage information reported by the UP specifically includes: detecting, by the CP, a first charging trigger event on a CP side, where the first charging trigger event is corresponding to information about a first quota, sending, by the CP, a first request message to the UP, to request the UP to report usage information of the first quota, where the first request message carries an identifier of the first quota or a list of UP reporting policy IDs corresponding to the first quota, and receiving, by the CP, usage information that is corresponding to the first quota and that is returned by the UP, where the usage information corresponding to the first quota includes the identifier of the first quota, all UP reporting policy IDs corresponding to the first quota, corresponding quota usage information, and a trigger currently met by the UP.

In a possible design, the receiving, by the CP, quota usage information reported by the UP specifically includes: receiving, by the CP, quota usage information that is corresponding to a second quota and that is reported by the UP, where the quota usage information corresponding to the second quota is usage information that is corresponding to the second quota corresponding to a second charging trigger event and that is reported to the CP after the UP detects the second charging trigger event on a UP side, and the usage information corresponding to the second quota includes an identifier of the second quota, all UP reporting policy IDs corresponding to the second quota, corresponding quota usage information, and a trigger currently met by the UP.

In a possible design, the receiving, by the CP, quota usage information reported by the UP specifically includes: detecting, by the CP, a third charging trigger event corresponding to a third quota, and sending a second request message to the UP to request the UP to report usage information of the third quota, receiving, by the CP, quota usage information that is corresponding to the third quota and that is reported by the UP, where the quota usage information is quota usage information that is corresponding to the third quota and that is reported to the CP after the UP detects a fourth charging trigger event on the UP side, and the usage information of the third quota includes an identifier of the third quota, all UP reporting policy IDs corresponding to the third quota, and corresponding quota usage information, and receiving, by the CP, a response message returned by the UP for the second request message, where the response message includes an indication that the requested quota usage information has been reported.

According to a second aspect, an embodiment of the present disclosure provides a charging method. The method is applied to a network architecture in which network control and data flow forwarding are separated, and includes: receiving, by a user plane UP entity, a UP reporting policy and UP quota information that are delivered by a control plane CP entity, collecting, by the UP, statistics about quota usage information of the UP based on the UP quota information and the UP reporting policy, and reporting, by the UP, the quota usage information of the UP to the CP.

In a possible design, the UP reporting policy includes one or more of the following: the reporting policy ID, a flow feature and/or an application ID in the charging rule, precedence of the UP reporting policy, a CP subscription event, an indication for use of UP quota information, or a used UP quota ID, and the UP quota information includes one or more of the following: a quota ID, a quota type, a quota value, one or more user plane triggers corresponding to a quota, or a corresponding UP reporting policy ID, and the collecting, by the UP, statistics about quota usage information based on the UP quota information and the UP reporting policy includes: matching, by the UP based on the flow feature and/or the application ID in the UP reporting policy and the precedence of the UP reporting policy, a service data flow corresponding to the flow feature and/or an application, using, for the matched service data flow, the UP quota information corresponding to the UP reporting policy, and separately collecting statistics about information of the detected service data flow based on the UP reporting policy.

In a possible design, the UP determines, based on the indication for use of UP quota information or the used UP quota ID in the UP reporting policy, that the UP reporting policy is used for online charging.

In a possible design, when executing the UP reporting policy, the UP determines, based on the "indication for use of UP quota information" parameter in the UP reporting policy, that the UP reporting policy is used for online charging, and if the UP reporting policy does not have associated UP quota information, requests the associated UP quota information from the CP.

In a possible design, when detecting the CP subscription event included in the reporting policy, the UP reports the event to the CP, where the quota usage information of the UP is not reported.

In a possible design, the UP establishes an association relationship between the UP reporting policy and the UP quota information based on the "used UP quota ID" parameter in the UP reporting policy, the UP establishes an association relationship between the UP reporting policy and the UP quota information based on the "corresponding UP reporting policy ID" parameter included in the UP quota information, or the UP establishes an association relationship between the UP reporting policy and the UP quota information based on the "used UP quota ID" parameter in the UP reporting policy and the "corresponding UP reporting policy ID" parameter included in the UP quota information.

In a possible design, if the UP quota information further includes one or more statistics collection division points, the UP separately collects statistics about information of service data flows before and after each statistics collection division point.

In a possible design, the UP receives an update message that is for the UP reporting policy and that is delivered by the CP or an update policy that is for the UP quota information and that is delivered by the CP, detects, based on a new UP reporting policy and/or a new UP quota policy, a service data flow corresponding to the flow feature and/or the application, uses, for the detected service data flow, UP quota information corresponding to the updated UP reporting policy, and collects statistics about information of the detected service data flow based on the new UP reporting policy.

In a possible design, the UP receives a first request message delivered by the CP, to request the UP to report usage information of a first quota, where the request message is delivered after the CP detects a first charging trigger event on a CP side, the first charging trigger event is corresponding to information about the first quota, and the first request message carries an identifier of the first quota or a list of UP reporting policy IDs corresponding to the first quota, and the UP returns the usage information of the first quota to the CP, where the usage information of the first quota includes the identifier of the first quota, all UP reporting policy IDs corresponding to the first quota, and corresponding quota usage information.

In a possible design, the UP reports quota usage information corresponding to a second quota to the CP, where the quota usage information corresponding to the second quota is quota usage information that is corresponding to the second quota corresponding to a second charging trigger event and that is reported to the CP after the UP detects the second charging trigger event on a UP side, and the usage information of the second quota includes an identifier of the second quota, all UP reporting policy IDs corresponding to the second quota, and corresponding quota usage information.

In a possible design, the reporting, by the UP to the CP, the statistics-collected quota usage information corresponding to the UP reporting policy ID specifically includes: reporting, by the UP, quota usage information corresponding to a third quota to the CP, where the quota usage information is quota usage information that is corresponding to the third quota and that is reported to the CP after the UP detects a fourth charging trigger event on the UP side, and the usage information of the third quota includes an identifier of the third quota, all UP reporting policy IDs corresponding to the third quota, and corresponding quota usage information, receiving, by the UP, a second request message sent by the CP, to request the UP to report the usage information of the third quota, where the second request message is a second request message sent to the UP when the CP detects a third charging trigger event corresponding to the third quota, and returning, by the UP, a response message for the second request message to the CP, where the response message includes an indication that the requested quota usage information has been reported.

According to a third aspect, the present disclosure provides a charging apparatus. The charging apparatus is applied to a network architecture in which network control and data flow forwarding are separated, and is a control plane CP function apparatus and specifically includes: a policy generation unit, configured to: execute a charging rule installed or activated by a policy and charging rules function PCRF entity, and generate a user plane UP entity reporting policy based on the charging rule, a quota information generation unit, configured to: request, from an online charging system OCS, a quota required by a rating group in the charging rule, receive a quota delivered by the OCS, and generate UP quota information based on the quota, and a sending unit, configured to: establish an association relationship between the UP reporting policy and the UP quota information, include, in the UP reporting policy and/or the UP quota information, a parameter that indicates the association relationship, and deliver the UP reporting policy and/or the UP quota information to the UP.

In a possible design, the charging apparatus further includes: a trigger unit, configured to: send a first request message to a user plane UP entity after a first charging trigger event is detected on a control plane side, to request the UP to report usage information of a first quota, where the request message carries an identifier of the first quota or a list of UP reporting policy IDs corresponding to the first quota, and the first charging trigger event is corresponding to information about the first quota, a receiving unit, configured to receive usage information that is corresponding to the first quota and that is returned by the UP, where the usage information corresponding to the first quota includes the identifier of the first quota, all UP reporting policy IDs corresponding to the first quota, corresponding quota usage information, and a trigger currently met by the UP, and a reporting unit, configured to generate, based on the usage information that is of the first quota and that is reported by the UP, a charging reporting message and send the charging reporting message to the OCS.

In a possible design, the charging apparatus further includes: a receiving unit, configured to: receive quota usage information that is corresponding to a second quota and that is reported by the UP, where the quota usage information corresponding to the second quota is usage information that is corresponding to the second quota corresponding to a second charging trigger event and that is reported to the CP after the UP detects the second charging trigger event on a UP side, and the usage information corresponding to the second quota includes an identifier of the second quota, all UP reporting policy IDs corresponding to the second quota, corresponding quota usage information, and a trigger currently met by the UP.

In a possible design, the charging apparatus further includes: a trigger unit, configured to: detect a third charging trigger event corresponding to a third quota, and send a second request message to the UP to request the UP to report usage information of the third quota, and a receiving unit, configured to receive quota usage information that is corresponding to the third quota and that is reported by the UP, where the quota usage information is quota usage information that is corresponding to the third quota and that is reported to the CP after the UP detects a fourth charging trigger event on the UP side, and the usage information of the third quota includes an identifier of the third quota, all UP reporting policy IDs corresponding to the third quota, and corresponding quota usage information, where the receiving unit is further configured to receive a response message returned by the UP for the second request message, where the response message includes an indication that the requested quota usage information has been reported.

According to a fourth aspect, the present disclosure provides a charging apparatus. The charging apparatus is applied to a network architecture in which network control and data flow forwarding are separated, and is a user plane UP function apparatus and specifically includes: a receiving unit, configured to receive a UP reporting policy and UP quota information that are delivered by a control plane CP function apparatus, a statistics collecting unit, configured to collect statistics about quota usage information of the UP based on the UP quota information and the UP reporting policy, and a reporting unit, configured to report the statistics-collected UP quota usage information to the CP.

In a possible design, the UP reporting policy includes one or more of the following: the reporting policy ID, a flow feature and/or an application ID in the charging rule, precedence of the UP reporting policy, a CP subscription event, an indication for use of UP quota information, or a used UP quota ID, the UP quota information includes one or more of the following: a quota ID, a quota type, a quota value, one or more user plane triggers corresponding to a quota, or a corresponding UP reporting policy ID, and the statistics collecting unit is further configured to: match, based on the flow feature and/or the application ID in the UP reporting policy and the precedence of the UP reporting policy, a service data flow corresponding to the flow feature and/or an application, use, for the matched service data flow, the UP quota information corresponding to the UP reporting policy, and separately collect statistics about information of the detected service data flow based on the UP reporting policy.

In a possible design, the receiving unit is further configured to: receive a first request message delivered by the CP, to request the UP to report usage information of a first quota, where the request message is delivered after the CP detects a first charging trigger event on a CP side, the first charging trigger event is corresponding to information about the first quota, and the first request message carries an identifier of the first quota or a list of UP reporting policy IDs corresponding to the first quota, and the reporting unit is further configured to return the usage information of the first quota to the CP, where the usage information of the first quota includes the identifier of the first quota, all UP reporting policy IDs corresponding to the first quota, and corresponding quota usage information.

According to a fifth aspect, the present disclosure provides a charging system. The charging system is applied to a network architecture in which network control and data flow forwarding are separated, and includes a user plane UP function apparatus and a control plane CP function apparatus. The CP function apparatus is configured to: execute a charging rule installed or activated by a policy and charging rules function PCRF entity, generate a user plane UP entity reporting policy based on the charging rule, request a required quota from an online charging system OCS based on the charging rule, receive a quota delivered by the OCS, generate UP quota information based on the quota, establish an association relationship between the UP reporting policy and the UP quota information, include, in the UP reporting policy and/or the UP quota information, a parameter that indicates the association relationship, and deliver the UP reporting policy and/or the UP quota information to the UP function apparatus, and the user plane UP function apparatus is configured to interact with the CP function apparatus and is configured to: receive the UP reporting policy and the UP quota information that are delivered by the CP function apparatus, collect statistics about quota usage information of the UP based on the UP quota information and the UP reporting policy, and report, to the CP function apparatus, the statistics-collected UP quota usage information.

According to a sixth aspect, an embodiment of the present disclosure provides a charging apparatus. The charging apparatus has a function of implementing the foregoing method embodiments. The function may be implemented by using hardware, or may be implemented by using corresponding software executed by hardware. The hardware or the software includes one or more units or modules that are corresponding to the foregoing function.

In a possible design, a structure of the charging apparatus includes a processor and a memory. The memory is configured to store an application program code that supports the charging apparatus in performing the foregoing methods, and the processor is configured to execute the application program code stored in the memory. The charging apparatus may further include a communications interface, configured for communication between the charging apparatus and another device or a communications network.

According to a seventh aspect, an embodiment of the present disclosure provides a computer storage medium, configured to store a computer software instruction used by the foregoing charging apparatus. The computer storage medium includes a program designed for the charging apparatus to implement the foregoing methods.

In the present disclosure, the name of the control plane entity, the user plane entity, the control plane function apparatus, the user plane function apparatus, the charging apparatus, the charging system, or the like and the names of the units thereof do not limit the devices. In actual application, these devices or units may have other names. Provided that functions of the devices are similar to those in the present disclosure, the devices fall within the scope of the claims in the present disclosure and their equivalent technologies.

Compared with the prior art, the solutions provided in the present disclosure implement online credit control in the architecture in which network control and data flow forwarding are separated. In this way, charging can support optimized network deployment, precise charging can be performed on a data service in the optimized deployment, and network efficiency and user experience can be improved.

BRIEF DESCRIPTION OF THE DRAWINGS

To describe the technical solutions in some embodiments of the present disclosure more clearly, the following briefly describes the accompanying drawings used for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION OF ILLUSTRATIVE EMBODIMENTS

The following clearly describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
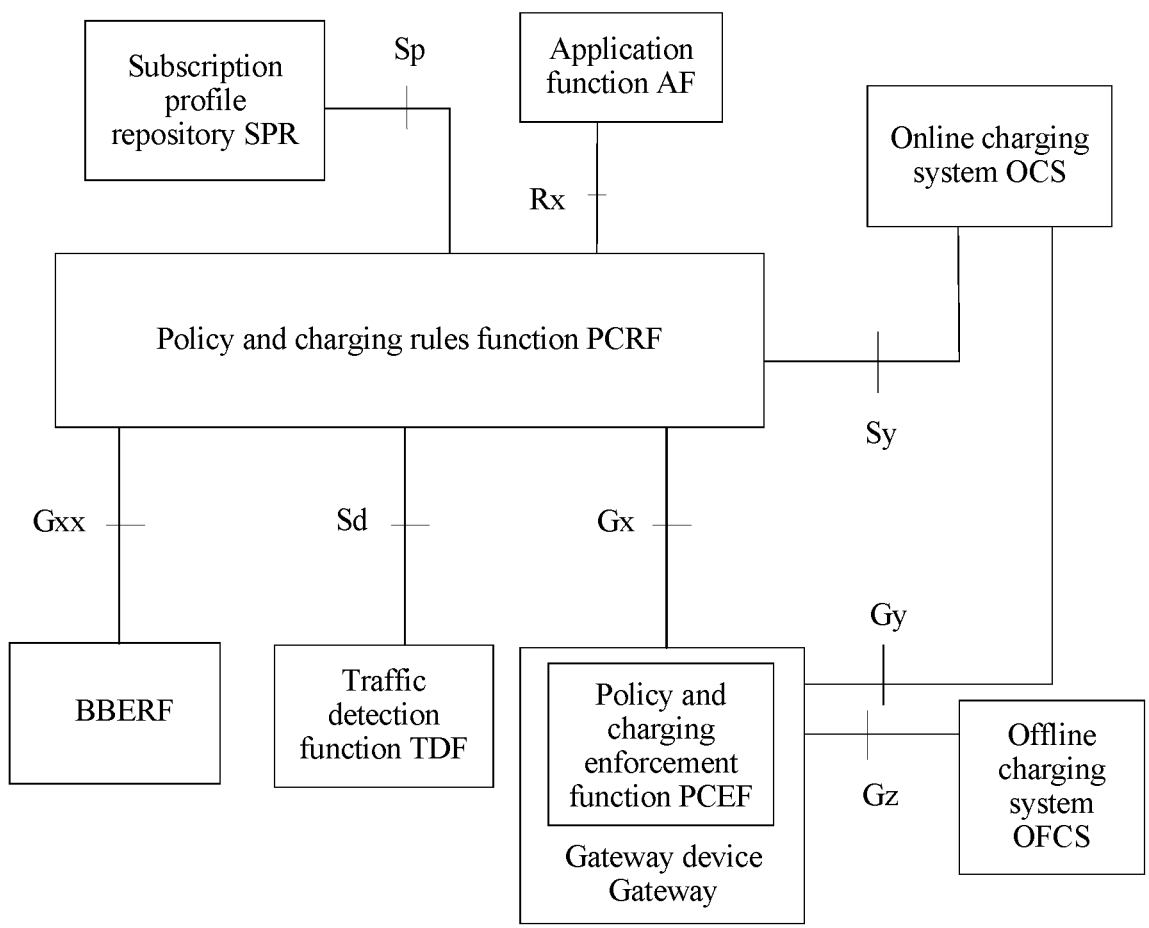
FIG. 1 is a structural diagram of a policy and charging control system in the prior art.

As shown in FIG. 1, FIG. 1 is a diagram of a PCC architecture defined in 3GPP, including a PCRF, a PCEF, a TDF, and an OCS. The PCRF is mainly configured to: determine a PCC rule or an ADC rule for a user, send, through a Gx interface, the determined PCC rule to the PCEF for execution, and deliver, through an Sd interface, the determined ADC rule to the TDF for execution. The PCC rule or the ADC rule includes a control policy and a charging policy. The control policy includes a quality of service (Quality of Service, QoS) parameter, gating control, redirection, and the like. The charging policy includes a charging key value, a charging method, a charging system address, a measurement method, and the like. The PCEF is mainly responsible for executing a PCC rule (including a dynamic PCC rule or a static PCC rule) activated by the PCRF. The PCEF is mainly deployed on a packet data gateway in a network. The TDF is mainly responsible for executing an ADC rule (including a dynamic ADC rule or a static ADC rule) activated by the PCRF. In subsequent descriptions, the PCEF is used as an example. Implementation of the TDF is similar to that of the PCEF.

Figure 2:
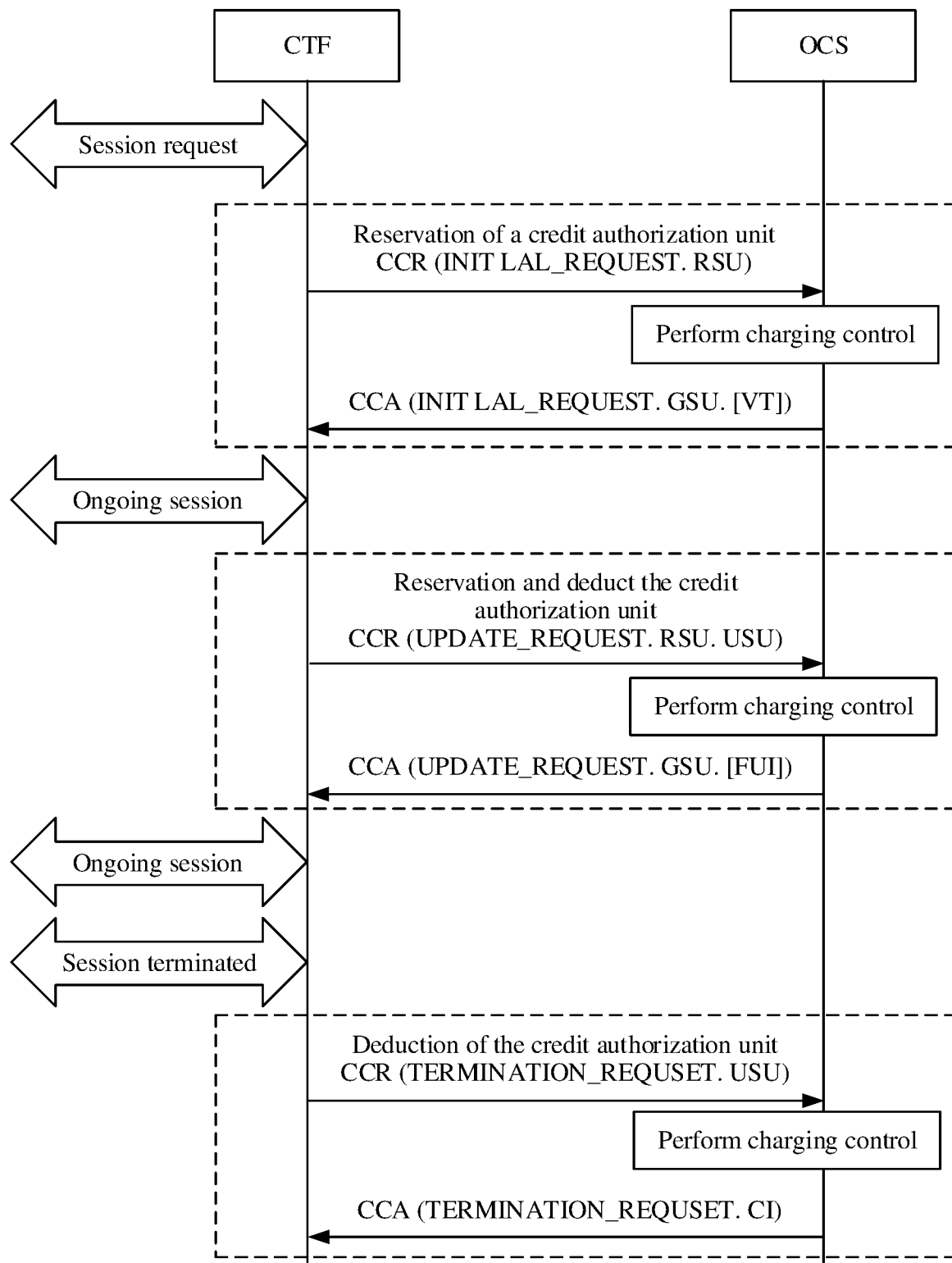
FIG. 2 is a flowchart of a basic online charging mechanism.

Referring to FIG. 2, currently, a basic online charging mechanism is as follows: An online charging trigger point CTF (a PCEF is used as an example herein) completes quota application and quota usage monitoring, executing a charging collection function, and detects whether conditions (for example, a user location change or a QoS change) for all charging trigger events are met. A PCEF located in a gateway apparatus applies to an OCS for a quota (quota) by using a rating group, and reports, under a specific condition, quota usage and collected service information to a charging system. The OCS deducts fees based on the reported quota usage and the reported service usage information. The PCEF uses the quota and collects the service information based on a charging granularity (classified into two types of granularities: SERVICE_IDENTIFIER_LEVEL or RATING_GROUP_LEVEL) delivered by a PCRF, and reports, under a specific condition, the quota usage and the collected service information to the charging system for fees deduction. If the charging granularity is RATING_GROUP_LEVEL, the PCEF needs to report service usage information for each rating group. If the charging granularity is SERVICE_IDENTIFIER_LEVEL, the PCEF needs to report service usage information for each combination of rating group and a service identifier. The charging trigger events (online charging is used as an example) for reporting charging information include the following: A service starts, a service stops, a granted quota is exhausted, a granted quota expires, an OCS requests re-authorization, a trigger event delivered by an OCS is met, and the like.

Figure 3:
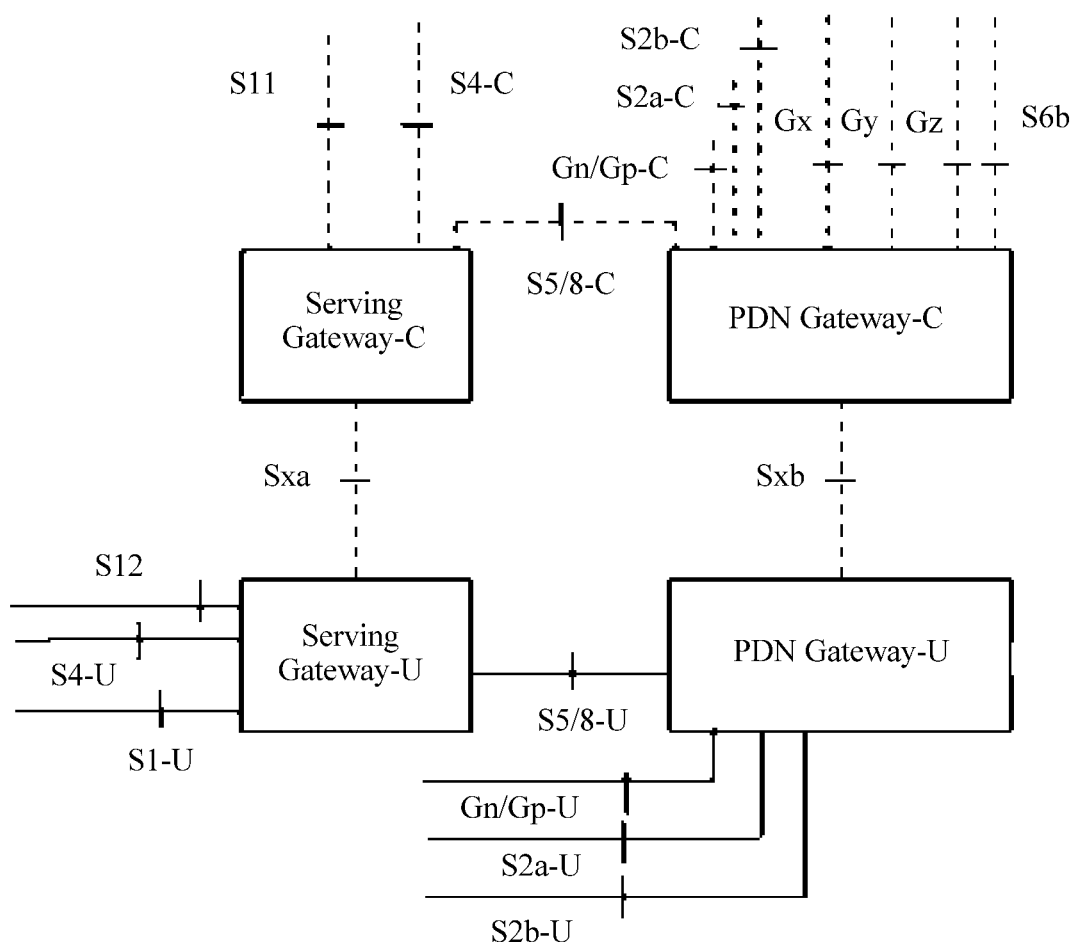
FIG. 3 is a schematic diagram of an architecture in which network control and data flow forwarding are separated.

Referring to FIG. 3, FIG. 3 is a schematic diagram of an architecture in which network control and data flow forwarding are separated. It can be seen from FIG. 3 that a gateway apparatus PDN-gateway is separated into two parts: a PDN gateway-C and a PDN gateway-U. Alternatively, the two parts are referred to as a CP entity and a UP entity that respectively process data related to a control plane and data related to a user plane. In the figure, dashed lines indicate the data of the control plane, and solid lines indicate the data of the user plane. The two network elements obtained after division are connected through an Sxb interface.

The embodiments of the present disclosure are described by using the foregoing CU-separated architecture of the PDN-gateway as an example. The embodiments of the present disclosure do not limit a deployment state in which a position of a user-plane gateway is moved downwards. The solutions provided in some embodiments of the present disclosure can also be used when a position of a gateway in another state is moved downwards.

Figure 4:
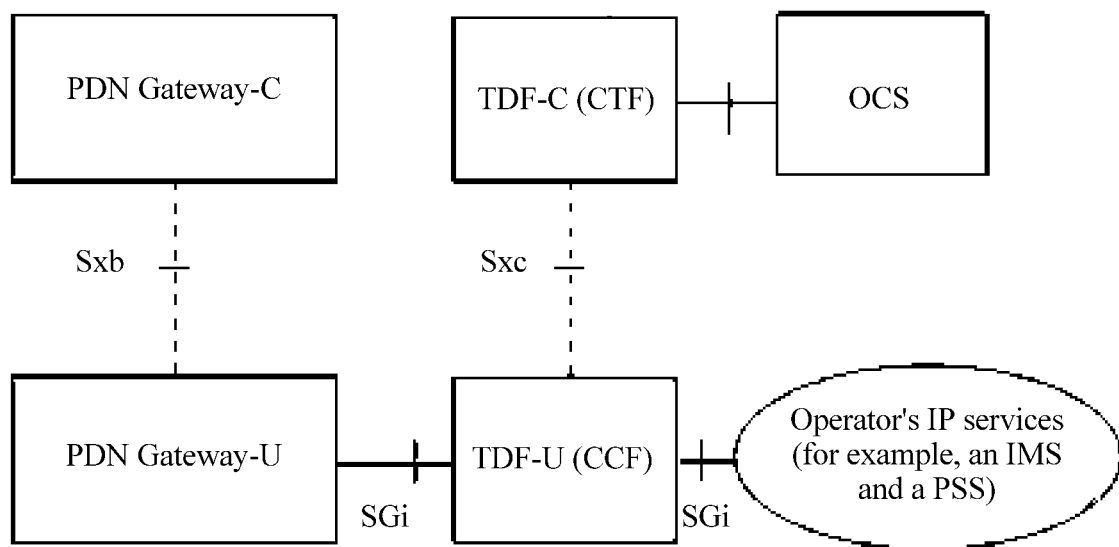
FIG. 4 is a schematic architectural diagram of charging in a CU-separated architecture according to an embodiment of the present disclosure.

For example, in an architecture in which network control and data flow forwarding are separated (that is, the CU-separated architecture) in FIG. 3, an overall charging architecture provided in some embodiments of the present disclosure is shown in FIG. 4 and includes function entities defined as follows:

CCF (Charging Collection Function, charging information collection function entity): The CCF herein is located in a user plane UP entity in a CU-separated data gateway, may be closer to an access network side, and is responsible for interacting with a CTF entity to complete quota usage and service data flow information collection (including trigger condition management, quota validity period management, quota usage monitoring, data flow information collection, and the like).

CTF (Charging Trigger Function, charging trigger function entity): The CTF herein is located in a control plane CP entity in a CU-separated data gateway. The CTF is responsible for establishing an online charging session with an OCS and applying for a quota (time, traffic, service-specific quota unit, and the like) and is an endpoint in the online charging session. In addition, the CTF is responsible for interacting with a UP to complete quota usage and service data flow information collection (including trigger condition management, quota distribution, and the like).

OCS (Online Charging System, online charging system): The OCS is responsible for establishing an online charging session with the CTF in some embodiments of the present disclosure and performing quota grant and is an endpoint in the online charging session. In addition, the OCS deducts an account balance based on charging information reported by the CTF.

In some embodiments of the present disclosure, descriptions are provided by using a CP entity (or CP) as a CTF entity and using a UP entity (or UP) as a CCF entity.

A user plane entity trigger event may include a trigger related to a data flow. For example, a quota corresponding to the data flow expires, no data flow is transmitted within a specified threshold, the data flow starts, and the data flow ends.

A control plane entity trigger event may include a trigger unrelated to a data flow, for example, a QoS change, a RAT type change, and a location change.

Based on the foregoing CU-separated network architecture and the CP function entity and the UP function entity that are defined in some embodiments of the present disclosure, with work division and cooperation between the CP and the UP in a charging process, online charging and credit control can be implemented in the CU-separated network architecture.

The network architecture and a service scenario that are described in some embodiments of the present disclosure are used to describe the technical solutions in some embodiments of the present disclosure more clearly, but do not limit the technical solutions provided in some embodiments of the present disclosure. A person of ordinary skill in the art may know that the technical solutions provided in some embodiments of the present disclosure are also applicable to similar technical problems as the network architecture evolves and a new service scenario appears.

Figure 5:
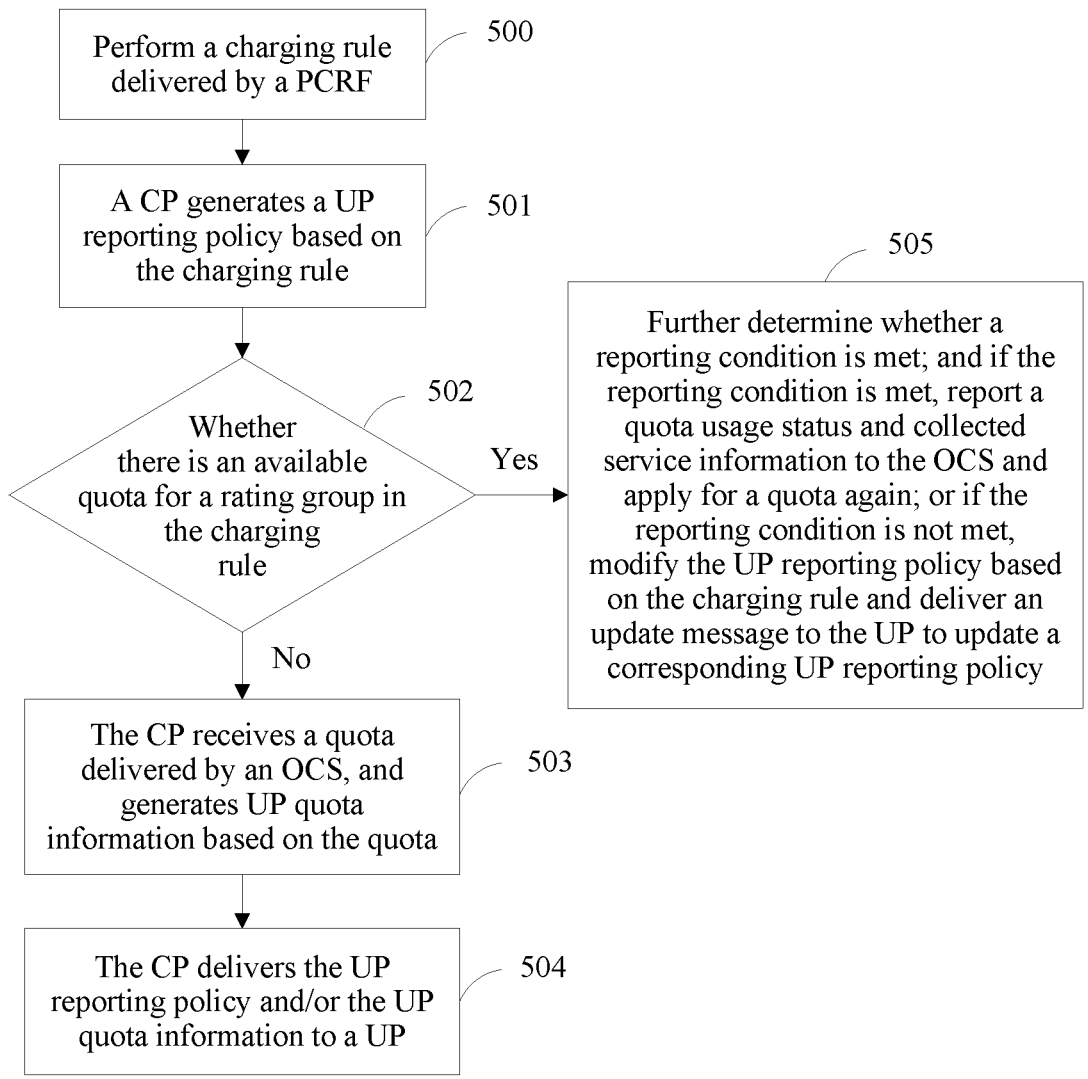
FIG. 5 is a flowchart of UP reporting policy generation and charging quota application according to an embodiment of the present disclosure.

Embodiment 1 of the present disclosure describes generation of a UP reporting policy and application of a charging quota. This embodiment mainly describes a method for generating a UP reporting policy and applying for a charging quota by using the UP entity and the CP entity that are defined in the foregoing embodiments in an architecture in which network control and data flow forwarding are separated, specifically, in the network architecture described in FIG. 4 in the foregoing embodiment. For a detailed procedure, refer to FIG. 5. Description of the method is as follows:

Step 500: A control plane CP entity executes a charging rule installed or activated by a policy and charging rules function PCRF entity.

When or after a data connection is established, the PCRF makes a policy decision based on information reported by the CP, information reported by an OCS, or the like, to determine a to-be-installed/activated PCC rule (PCC rule), and delivers a command to the CP to install/activate the PCC rule, and the CP executes the PCC rule. The PCC rule may be a dynamic PCC rule delivered and installed by the PCRF or a static PCC rule stored on the CP and activated by the PCRF.

There may be one or more charging rules herein.

The PCC rule includes a charging parameter. The charging parameter refers to a parameter used for charging in the PCC rule. Each charging PCC rule has an identifier ID and includes a group of charging parameters, including: a rating group, a charging method, a measurement method, a reporting level, precedence, and the like. A plurality of charging rules may include a same rating group. In other words, one rating group may be corresponding to one or more charging rules.

The charging rule in this application may refer to a group of charging parameters included in the PCC rule, or may refer to the PCC rule itself. Because a ratio of the PCC rule and the charging parameters included in the PCC rule is 1:1, implementation of the solution in the present disclosure is not affected when the charging rule is understood as either of the two meanings.

Step 501: The CP generates or modifies a user plane UP entity reporting policy based on the charging rule.

The UP reporting policy is used by the CP to indicate, to the UP, how to collect statistics about service flow information (for example, collect statistics about which service data flow information together) and how to report, to the CP, the statistics-collected service data flow information.

That the CP generates or modifies a UP reporting policy based on the charging rule is specifically as follows:

If the charging rule is a new charging rule, the CP generates one corresponding UP reporting policy for each charging rule (the charging rule includes one granularity "Reporting Level" based on which information is reported to a charging system). The UP reporting policy includes at least one or more of the following parameters: a reporting policy ID (that uniquely identifies the UP reporting policy), a flow feature and/or an application ID in the charging rule (the application ID is used to identify an application through deep packet inspection), precedence of the UP reporting policy, a CP subscription event, an indication for use of UP quota information, or a used UP quota ID. If UP quota information includes a "one or more UP reporting policy identifiers corresponding to the quota in the UP quota information" parameter, it means that the UP reporting policy can be associated with the UP quota information. In this case, the UP reporting policy may not carry the "used UP quota ID" parameter, and the UP establishes an association relationship between the UP reporting policy and the UP quota information based on the "one or more UP reporting policy identifiers corresponding to the quota in the UP quota information" parameter included in the UP quota information. Alternatively, if the UP reporting policy carries the "used UP quota ID" parameter and the UP quota information includes a "one or more UP reporting policy identifiers corresponding to the quota in the UP quota information" parameter, the UP establishes an association relationship between the UP reporting policy and the UP quota information based on the "used UP quota ID" parameter in the UP reporting policy and the "one or more UP reporting policy identifiers corresponding to the quota in the UP quota information" in the UP quota information.

The precedence is corresponding to precedence in the charging rule, and the precedence is used to match a service data flow with a corresponding UP reporting policy and a corresponding UP quota, to use the quota.

The "indication for use of UP quota information" and "used UP quota ID" parameters may be both exist, or only one of them is used. If both the parameters exist, the UP determines, based on the "indication for use of UP quota information", whether the UP reporting policy is used for online charging (that is, whether the UP reporting policy needs to be associated with a specific quota, and whether to control bypassing of the service data flow based on the quota), and determines a to-be-used quota based on the "used UP quota ID." If one of the parameters is used, when the "used UP quota ID" is used, if the UP reporting policy includes the UP quota ID, the UP determines that the UP reporting policy is used for online charging, or when the "indication for use of UP quota information" is used, a value of the "indication for use of UP quota information" may be a Boolean value, and when a value of the parameter is true, the UP determines that the UP reporting policy is used for online charging. If the UP determines that the UP reporting policy is used for online charging, the UP collects statistics about a service flow based on the UP quota information associated with the UP reporting policy, and when no quota is associated (for example, the quota usage information has been reported, or the CP has not granted a quota) or an associated quota is exhausted, the UP pauses data flow transmission, and optionally, applies to the CP for a corresponding quota. If the UP determines that the UP reporting policy is used for offline charging, the UP directly collects statistics about usage information of the service data flow based on the UP reporting policy, and the statistics collection does not affect service data flow transmission.

The CP may deliver the CP subscription event to the UP, so that the UP reports the event (to indicate that the event occurs) to the CP when detecting the event. In this case, quota usage information may not be reported, only the event is reported, and the CP performs quota management based on the event. For example, in some scenarios, the CP may apply for a quota only when a data flow starts. In this case, the CP may deliver "a data flow starts" event in the UP reporting policy. When detecting that the data flow corresponding to the UP reporting policy starts, the UP reports the event to the CP, and then the CP applies to the OCS for a quota based on the event. The CP subscription event herein is different from a UP trigger. The UP trigger is used to trigger reporting of quota usage. The CP subscription event is used to only notify the CP of the event, and does not affect quota usage or trigger reporting of the quota usage information corresponding to the UP reporting policy.

When the UP executes the UP reporting policy and determines, based on the "indication for use of UP quota information", that a quota is required but currently there is no available UP quota (that is, currently, the UP does not have UP quota information associated with the UP reporting policy), the UP may request, from the CP, a UP quota associated with the UP reporting policy, and the CP allocates a quota based on the request. For example, the CP applies to the OCS for a new quota and delivers the new quota, or modifies the UP reporting policy to associate the UP reporting policy with an existing quota.

The CP saves a correspondence between the charging rule and the UP reporting policy. For example, the CP saves a correspondence between the charging rule ID and the UP reporting policy ID.

If the charging rule is an update to an existing charging rule, the CP finds a UP reporting policy corresponding to the charging rule, and modifies the corresponding UP reporting policy based on information in the charging rule.

For example, the UP reporting policy generated by the CP is as follows:

Reporting policy ID
Flow information (service flow information)
Application ID (application identifier)
Precedence (precedence)
Event (CP subscription event)
Online Control (Indication for use of UP quota information)
Quota ID (used UP quota ID)

Step 502: The CP requests a required quota from an online charging system OCS based on the charging rule.

Specifically, the CP applies, based on one or more executed charging rules, to the OCS for a quota corresponding to a rating group in the charging rule. Service data flows corresponding to the charging rule belong to a same charging session between the CP and the OCS.

Specifically, the CP determines whether there is an available quota for the rating group in the charging rule. If there is no available quota, the CP applies, based on the charging rule, to the OCS for a quota for the rating group in the charging rule, and performs steps 503 to 504. If there is an available quota, the CP performs step 505.

Specifically, the CP determines a granularity for a Gy session corresponding to the charging rule. If the granularity for the Gy session is per IP-CAN bearer, the CP determines whether the IP-CAN bearer has a quota available for the rating group. If the session granularity is an IP-CAN session granularity, the CP determines whether the IP-CAN session has a quota available for the rating group. Generally, the quota is a quota belonging to a Gy session. Therefore, when determining whether there is an available quota, the CP needs to search a corresponding Gy session.

Step 503: The CP receives a quota delivered by the OCS, and generates UP quota information based on the quota delivered by the OCS.

The UP quota information is used for the UP to control a limit of data usage in the service data flow.

Optionally, before generating the UP quota information, the CP may determine, based on a CCA message returned by the OCS, whether to deliver quota information to the UP. A specific method is as follows:

If the OCS delivers a quota of 0 by using the CCA message or returns an error message, the CP does not deliver quota information to the UP. In other words, the CP does not generate UP quota information.

If the CP can manage usage of the quota (in other words, the CP has a function of using the quota), the CP does not deliver quota information to the UP. For example, if the CP determines that the quota is continuous time quotas or a CP-side event quota, the CP does not deliver quota information to the UP, and the CP uses the quota.

That the CP generates quota information for the UP based on the quota delivered by the OCS is specifically: correspondingly generating, by the CP, UP quota information for each quota delivered by the OCS.

The UP quota information includes: a quota ID (corresponding to the rating group in the charging rule corresponding to the Gy session), a quota type (traffic, duration, traffic+duration, and the like), a quota value, one or more user plane triggers corresponding to the quota, and one or more UP reporting policy identifiers corresponding to the quota. If the UP reporting policy carries the "used UP quota ID" parameter, it means that the UP reporting policy may be associated with the UP quota information. In this case, the UP quota information may not include the "one or more UP reporting policy identifiers corresponding to the quota in the UP quota information" parameter, and the UP establishes an association relationship between the UP reporting policy and the UP quota information based on the "used UP quota ID" parameter in the UP reporting policy. Alternatively, if the UP reporting policy carries the "used UP quota ID" parameter and the UP quota information includes a "one or more UP reporting policy identifiers corresponding to the quota in the UP quota information" parameter, the UP establishes an association relationship between the UP reporting policy and the UP quota information based on the "used UP quota ID" parameter in the UP reporting policy and the "one or more UP reporting policy identifiers corresponding to the quota in the UP quota information" in the UP quota information.

The user plane triggers corresponding to the quota include one or more of the following information: the quota delivered by the OCS has a corresponding quota usage parameter (for example, a Quota-Consumption-Time (quota statistics collection interval), a Time-Quota-Mechanism (quota usage statistics collection method), a Quota-Holding-Time (quota validity period), a Time-Quota-Threshold (time quota consumption threshold), or a Volume-Quota-Threshold (volume quota consumption threshold)), or the CP determines, based on a local configuration, that a quota usage parameter needs to be delivered to the UP.

If the quota delivered by the OCS includes a time division point or an event division point, for example, a rating switching point or some trigger events that do not need to be reported in real time, the UP quota information further includes one or more statistics collection division points, so that the UP can use the quota, collect statistics about usage information, and report the usage information, based on the division point, where the statistics collection division point may be a time or an event.

The CP saves a correspondence between the UP quota ID and the quota delivered by the OCS.

A method in which the CP determines one or more UP reporting policy identifiers corresponding to the quota is as follows: If the quota delivered by the OCS is a quota allocated for a rating group in one or more charging rules, the CP associates UP quota information corresponding to the quota delivered by the OCS with UP reporting policies corresponding to the one or more charging rules. Alternatively, if the quota delivered by the OCS is a quota allocated for a rating group and a service identifier in one or more charging rules, the CP associates UP quota information corresponding to the quota delivered by the OCS with UP reporting policies corresponding to the one or more charging rules. In other words, the CP associates the UP quota information with only a UP reporting policy corresponding to a charging rule corresponding to the service identifier. Specifically, the CP first determines, based on a quota request, a charging rule corresponding to the quota delivered by the OCS, and then determines a corresponding UP reporting policy based on a saved correspondence between the charging rule and the UP reporting policy.

The CP separates a CP trigger and a UP trigger from triggers delivered by the OCS, and includes the UP trigger in the UP quota information.

If the OCS delivers a single quota (to be specific, each quota is used only for a rating group in the Gy session), the CP generates UP quota information for each rating group. The UP reporting policy identifiers included in the UP quota information are all UP reporting policies corresponding to one or more charging rules corresponding to the rating group.

If the OCS delivers a quota pool (to be specific, the OCS allocates one quota for a plurality of rating groups), and the quota pool is corresponding to a plurality of charging rules (a plurality of rating groups) in the Gy session, the CP generates UP quota information for the plurality of rating groups in the quota pool. The UP reporting policy identifiers included in the UP quota information are all UP reporting policies corresponding to the plurality of charging rules.

For example, the UP quota information generated by the CP is as follows:
  Quota-ID (quota ID)
  Quota (quota parameter)
  Statistics collection division point (one or more, time or events, and used by the UP to use the quota based on the time division point or the event division point, collect statistics about usage information, and report the usage information)
  CC-Time (time quota)
  CC-Total-Octets (volume quota)
  CC-Input-Octets (uplink volume quota)
  CC-Output-Octets (downlink volume quota)
  UP reporting policy ID (one or more)
  UP trigger (one or more)

Step 504: The CP determines (or establishes) an association relationship between the UP reporting policy and the UP quota information, includes, in the UP reporting policy and/or the UP quota information, a parameter that indicates the association relationship, and delivers the UP reporting policy and/or the UP quota information to the UP.

A method in which the CP determines (or establishes) an association relationship between the UP reporting policy and the UP quota information may be specifically as follows: If the quota delivered by the OCS is a quota allocated for a rating group in one or more charging rules, the CP associates the UP quota information corresponding to the quota delivered by the OCS with UP reporting policies corresponding to the one or more charging rules. Alternatively, if the quota delivered by the OCS is a quota allocated for a rating group and a service identifier in one or more charging rules, the CP associates the UP quota information corresponding to the quota delivered by the OCS with UP reporting policies corresponding to the one or more charging rules. In other words, the CP associates the UP quota information with only a UP reporting policy corresponding to a charging rule corresponding to the service identifier. Specifically, the CP first determines, based on the quota request, the charging rule corresponding to the quota delivered by the OCS, and then determines the corresponding UP reporting policy based on the saved correspondence between the charging rule and the UP reporting policy.

A method of including, in the UP reporting policy and/or the UP quota information, a parameter that indicates the association relationship may be specifically as follows: including a used UP quota ID to the UP reporting policy, including a UP reporting policy identifier corresponding to the UP quota information in the UP quota information, or including a used UP quota ID in the UP reporting policy, and including a UP reporting policy identifier corresponding to the UP quota information in the UP quota information.

Specifically, after generating the UP reporting policy or the UP quota information, the CP may separately deliver the generated UP reporting policy or the generated UP quota information. The UP reporting policy or the UP quota information is associated with currently existing UP quota information or a currently existing UP reporting policy of the UP, or is not associated with any currently existing UP quota information or any currently existing UP reporting policy of the UP until the CP subsequently delivers the UP quota information or the UP reporting policy. Alternatively, the CP may simultaneously deliver the UP reporting policy and the UP quota information (for example, when generating or modifying the UP reporting policy based on the charging rule, the CP first saves the policy, and then delivers the policy together with the UP quota information after the CP generates the UP quota information based on the quota delivered by the OCS).

After the UP receives the UP reporting policy and the UP quota information that are delivered by the CP, the UP collects statistics about quota usage information and service data flow information based on the UP quota information and the UP reporting policy, and when a reporting condition is met, reports the statistics-collected quota usage information of the UP reporting policy ID to the CP (for details, refer to Embodiments 2, 3, and 4 in the following). Specifically, the UP monitors, based on the flow feature and/or the application ID in the UP reporting policy and the precedence of the UP reporting policy, a service data flow corresponding to the flow feature and/or an application, uses, for the detected service data flow, the UP quota information corresponding to the UP reporting policy (the UP quota information corresponding to the UP reporting policy is determined based on association information carried in the UP reporting policy and/or the UP quota information), and separately collects statistics about information of the detected service data flow. If the UP quota information further includes one or more statistics collection division points, the UP separately collects statistics about information of service data flows before and after each statistics collection division point. If the UP receives an update message that is for the UP reporting policy and that is delivered by the CP or an update policy that is for the UP quota information and that is delivered by the CP, the UP detects, based on precedence of a new UP reporting policy and/or a new UP quota policy, a service data flow corresponding to the flow feature and/or the application, uses, for the detected service data flow, UP quota information corresponding to the updated UP reporting policy, and collects statistics about information of the detected service data flow based on the new UP reporting policy. If the CP delivers the CP subscription event to the UP, the UP detects the event and reports the event to the CP when the event occurs. In this case, quota usage information may not be reported, and only the event is reported. In this way, the UP reports the event to the CP when detecting the event, and the CP manages a quota based on the event. When the UP executes the reporting policy and determines, based on the "indication for use of UP quota information", that a quota is required but currently there is no available UP quota, the UP may request a quota from the CP.

Note: Step 503 and step 504 may be performed for a plurality of times. In other words, even if steps 501 and 502 are not performed, step 503 and step 504 may be performed based on a quota usage status (for example, a quota is exhausted).

Step 505: If there is an available quota and the charging rule has a corresponding UP reporting policy, the CP modifies the UP reporting policy based on the charging rule, and delivers an update message to the UP to update the corresponding UP reporting policy, or if there is an available quota but the charging rule does not have a corresponding UP reporting policy, the CP generates a new UP reporting policy for the charging rule, and delivers the new UP reporting policy to the UP (which is used in a case in which the UP quota information does not include a "used UP quota ID" parameter), or the CP generates a new UP reporting policy for the charging rule, and generates updated UP quota information for UP quota information corresponding to the rating group in the charging rule, and delivers the new UP reporting policy and the updated UP quota information to the UP (which is used in a case in which the UP quota information includes a "used UP quota ID" parameter), where the updated UP quota information includes the new UP reporting policy.

Further, if a CP-side trigger is met due to the charging rule, the CP first reports a quota usage status and collected service information to the OCS (for a specific reporting method, refer to Embodiment 2), and then applies for a quota again.

In step 505, the UP quota information sent by the CP to the UP includes a trigger event, and when the trigger event is met, the UP reports usage information of the quota and collected service data flow information to the CP based on the UP reporting policy.

According to the solution in this embodiment of the present disclosure, in the architecture in which network control and data flow forwarding are separated, the CP generates the UP reporting policy based on the charging policy activated by the PCRF, determines, based on the quota delivered by the OCS, whether to deliver quota information to the UP, then generates the UP quota information, and establishes an association between the UP reporting policy and the UP quota information. In this way, online charging credit control and usage information reporting are implemented in the architecture in which the CP and the UP are separated.

Figure 6:
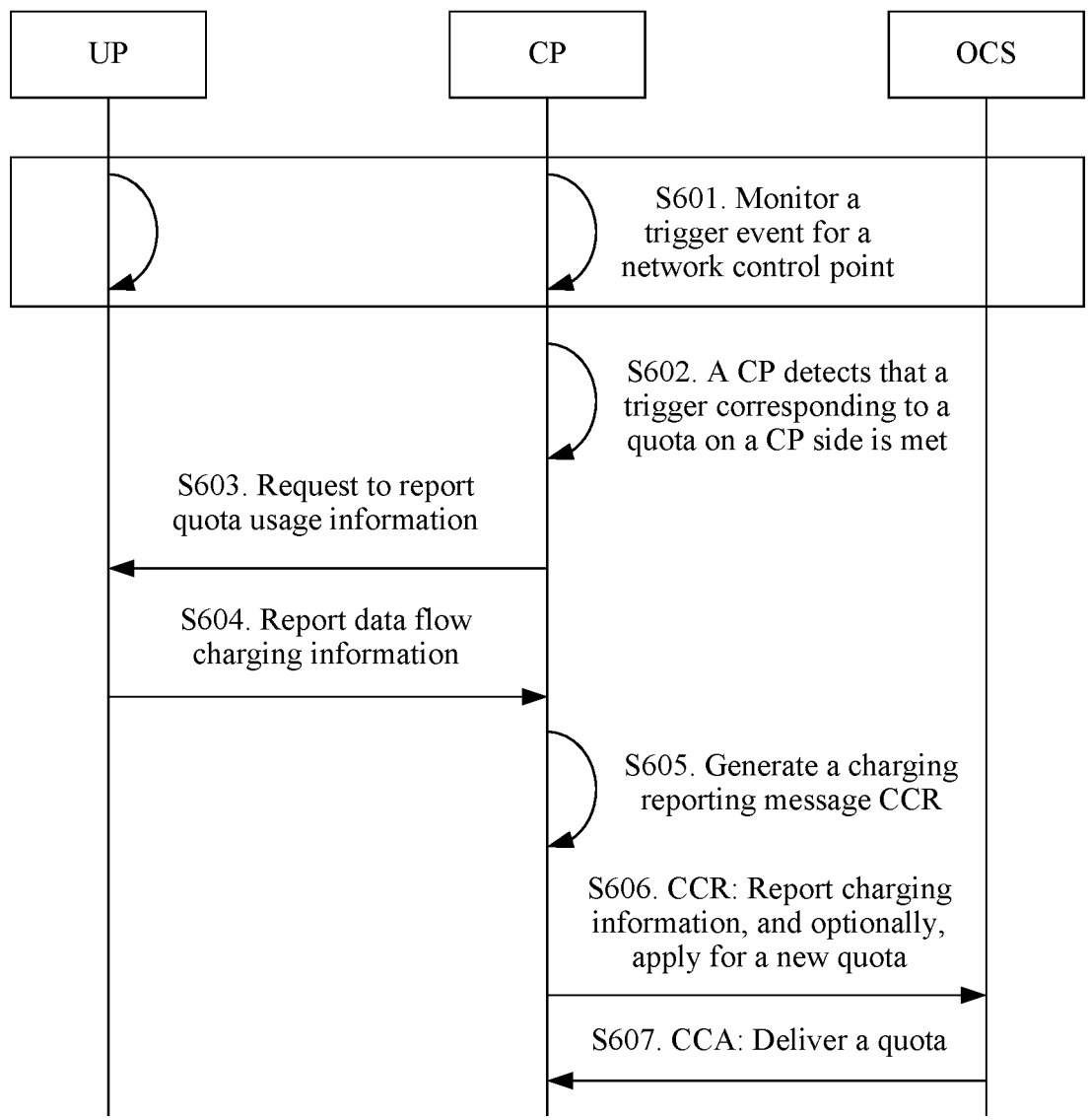
FIG. 6 is a flowchart of reporting charging quota usage information when a CP trigger condition is met according to an embodiment of the present disclosure.

Embodiment 2 of the present disclosure mainly describes a method for reporting charging quota usage information and service data flow information that is performed by using the CP function entity and the UP function entity that are defined in the foregoing embodiments when a CP trigger condition is met after UP quota information and a UP reporting policy are delivered based on the method described in Embodiment 1. The method is performed in an architecture in which network control and data flow forwarding are separated. Specifically, the architecture may be the network architecture described in FIG. 4 in the foregoing embodiment. In this embodiment, FIG. 6 shows a main process for reporting the charging quota usage information when the CP trigger condition is met. Detailed description of the process is as follows:

Step 601: A CP detects a trigger event on a CP, and a UP detects a trigger event on a UP and monitors usage of UP quota information.

Step 602: The CP detects that a trigger event (for example, a first charging trigger event, where the first charging trigger event is corresponding to information about a first quota) corresponding to a quota (for example, the information about the first quota) on a CP side is met, for example, a user location change is detected. Herein, alternatively, the CP may receive a re-authorization request RAR trigger delivered by an OCS.

Step 603: The CP delivers a request message (for example, a first request message) to the UP, to request to report usage information of the quota, where the request message carries an ID of the quota or a list of UP reporting policy IDs corresponding to the quota.

Step 604: The CP receives usage information that is corresponding to the first quota and that is returned by the UP, where the usage information corresponding to the first quota includes an identifier of the first quota, all UP reporting policy IDs corresponding to the first quota, corresponding quota usage information, and a trigger currently met by the UP.

Specifically, the UP obtains the quota usage information from UP quota information corresponding to the ID of the quota, or the UP obtains the usage information corresponding to all the UP reporting policy IDs carried in the request. Statistics about the usage information are collected based on a granularity defined in the UP reporting policy. The UP replies a response message to the CP. The response message carries the ID of the quota, the obtained quota usage information corresponding to the quota, and a trigger met by the UP, and the like. The quota usage information includes a UP reporting policy ID and corresponding usage information.

If the UP quota information delivered by the CP carries a statistics collection division point (one or more, time or events, and used for the UP to use the quota based on the time division point or the event division point, collect statistics about usage information, and report the usage information), the quota usage information reported by the UP includes information before and after the time division point.

For example, the message (a quota-related part) reported by the UP to the CP is as follows:

Quota-ID (if the quota ID is used in the request)
Met trigger (one or more)
Used-Quota-Value
UP reporting policy ID 1
Quota usage information corresponding to the UP reporting policy ID 1
Division indication (optionally, if the CP delivers one or more statistics collection division points, this parameter indicates a statistics collection division point based on which statistics about the usage information herein is collected by segment)
Used-Quota-Value
UP reporting policy ID 2
Quota usage information corresponding to the UP reporting policy ID 2
Division indication (optionally, if the CP delivers one or more statistics collection division points, this parameter indicates a statistics collection division point based on which statistics about the usage information herein is collected by segment)

Step 605: The CP generates a charging reporting message CCR based on a saved correspondence between a UP quota ID and a quota delivered by the OCS, where the CCR includes an RG of the quota, quota usage information corresponding to each UP reporting policy ID, information about the control plane entity (for example, a user location or a PLMN identifier), a trigger met by the CP, and a trigger (if any) met by the UP, and optionally, may further carry an ID or an address of the UP.

Step 606: The CP sends the CCR to the OCS to report charging information, and optionally, to apply for a new quota.

For a step after the OCS delivers the new quota, refer to steps 503 and 504 in Embodiment 1.

According to the solution in this embodiment of the present disclosure, in the architecture in which network control and data flow forwarding are separated, the CP monitors a trigger event of a control plane entity on a network side, and when detecting that the trigger event corresponding to the quota on the CP side is met, requests the UP to report the quota usage information corresponding to the event to the UP and the OCS. In this way, charging quota usage information is collected and reported in the CU-separated architecture when the control plane entity trigger condition is met.

Figure 7:
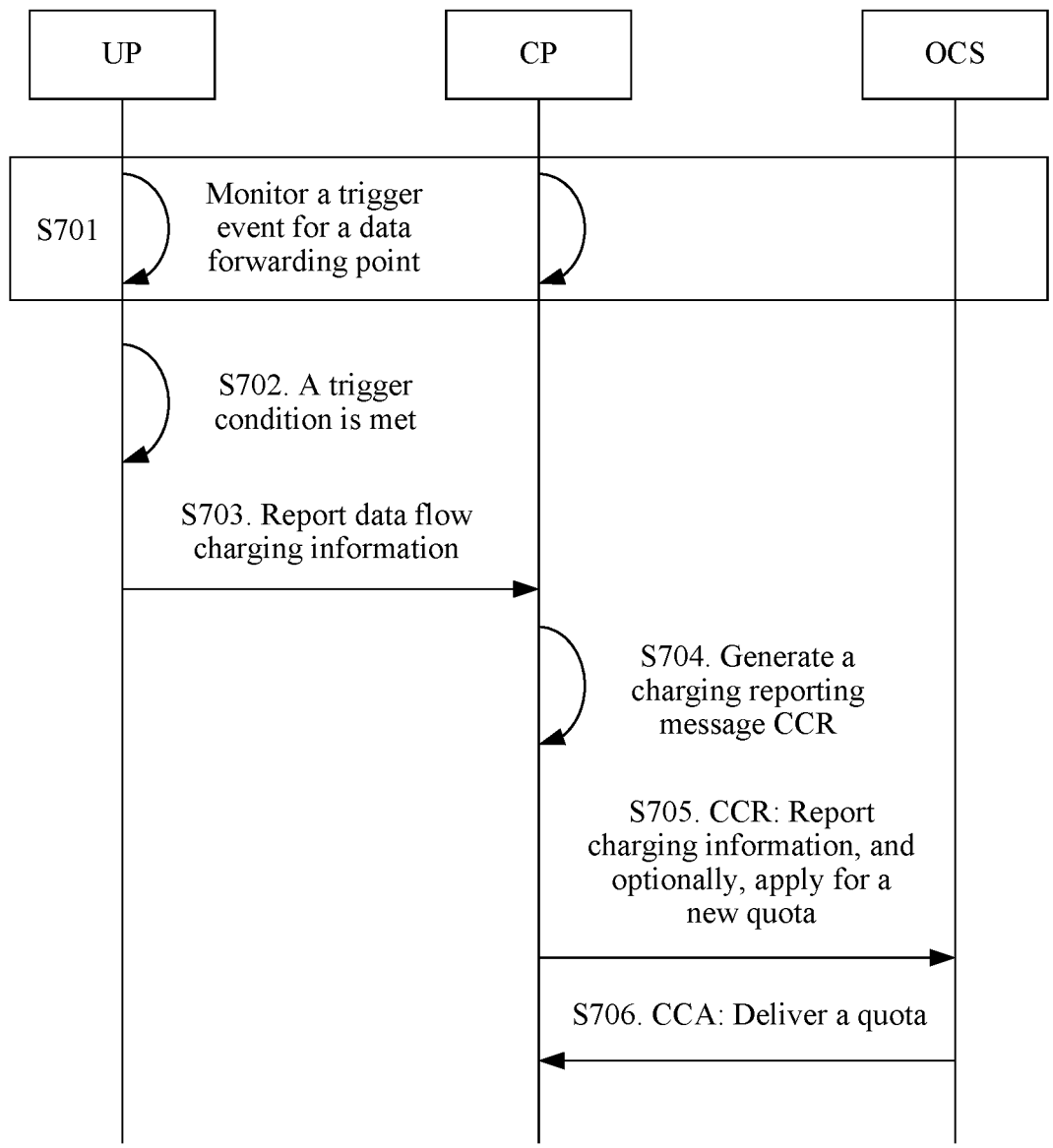
FIG. 7 is a flowchart of reporting charging quota usage information when a UP trigger condition is met according to an embodiment of the present disclosure.

Embodiment 3 of the present disclosure mainly describes a method for reporting charging quota usage information that is performed by using the UP entity and the CP entity that are defined in the foregoing embodiments when a user plane entity trigger condition is met after UP quota information and a UP reporting policy are delivered based on the method described in Embodiment 1. The method is performed in an architecture in which network control and data flow forwarding are separated. Specifically, the architecture may be the network architecture described in FIG. 4 in the foregoing embodiment. In this embodiment, FIG. 7 shows a main process for reporting the charging quota usage information when the user plane trigger condition is met. Description of the process is as follows:

Step 701: A CP detects a trigger event on a CP, and a UP detects a trigger event on a UP and monitors usage of UP quota information.

Step 702: The UP detects that a trigger event (for example, a second charging trigger event) corresponding to a quota (for example, a second quota) on a UP side is met, for example, detects that a quota expires, and the UP obtains usage information corresponding to all UP reporting policy IDs corresponding to the quota, where statistics about the usage information are collected based on a granularity defined in the UP reporting policy.

Step 703: The UP sends a reporting message to the CP, where the reporting message carries an ID of the quota, the obtained quota usage information corresponding to the quota, a trigger currently met by the UP, and the like. The usage information is separately packaged based on the UP reporting policy (to be specific, a UP reporting policy ID and corresponding usage information).

A correspondence between a quota and a UP reporting policy ID is defined in the UP quota information delivered by the CP.

If the UP quota information delivered by the CP carries a statistics collection division point (one or more, time or events, and used for the UP to use the quota based on the time division point or the event division point, collect statistics about usage information, and report the usage information), the quota usage information reported by the UP includes information before and after the time division point.

For example, the message (a quota-related part) reported by the UP to the CP is as follows:

Quota-ID (if the quota ID is used in the request)
Met trigger (one or more)
Used-Quota-Value
UP reporting policy ID 1
Quota usage information corresponding to the UP reporting policy ID 1
Division indication (optionally, if the CP delivers one or more statistics collection division points, this parameter indicates a statistics collection division point based on which statistics about the usage information herein is collected by segment)
Used-Quota-Value
UP reporting policy ID 2
Quota usage information corresponding to the UP reporting policy ID 2
Division indication (optionally, if the CP delivers one or more statistics collection division points, this parameter indicates a statistics collection division point based on which statistics about the usage information herein is collected by segment)

Step 704: The CP generates a charging reporting message CCR based on a correspondence between a UP reporting policy ID and a charging rule, where the CCR includes an RG of the quota, quota usage information corresponding to each UP reporting policy ID, information about the control plane entity (for example, a user location or a PLMN identifier), a trigger met by the UP, and a trigger (if any) met by the CP, and optionally, may further carry an ID or an address of the UP.

Step 705: The CP sends the CCR to an OCS to report charging information, and optionally, to apply for a new quota.

Step 706: The OCS delivers a quota by using a CCA message.

For a step after the OCS delivers the new quota, refer to steps 503 and 504 in Embodiment 1.

According to the solution in this embodiment of the present disclosure, in the architecture in which network control and data flow forwarding are separated, the UP located in the user plane entity monitors the user plane entity trigger event, and when detecting that the trigger event corresponding to the quota on the UP side is met, reports the quota usage information corresponding to the event to the corresponding CP. In this way, charging quota usage information is collected and reported in the CU-separated architecture when the user plane entity trigger condition is met.

Embodiment 4 of the present disclosure mainly describes a method for reporting charging quota usage information that is performed by using the UP entity and the CP entity that are defined in the foregoing embodiments when both a user plane entity trigger condition and a control plane entity trigger condition are met after UP quota information and a UP reporting policy are delivered based on the method described in Embodiment 1. The method is performed in an architecture in which network control and data flow forwarding are separated. Specifically, the architecture may be the network architecture described in FIG. 2 in the foregoing embodiment.

If both the CP and the UP detect that a trigger for a corresponding quota (for example, a third quota) is met. For example, if the CP detects a user location change, and meanwhile the UP detects that the quota expires, the CP triggers "the CP delivers a request to request the UP to report charging information", and meanwhile the UP triggers "the UP reports the charging information to the CP". The "meanwhile" herein means that when the CP detects that a CP trigger (for example, a third charging trigger event) is met, before the UP receives a request message (for example, a second request message) delivered by the CP for the CP trigger, the UP also detects that a UP trigger (for example, a fourth charging trigger event) is met, or when the UP detects that a UP trigger (for example, a fourth charging trigger event) is met, before the CP receives a reporting message sent by the UP for the trigger, the CP also detects that a CP trigger (for example, a third charging trigger event) is met. The "meanwhile" is not necessarily an absolutely same moment.

In the foregoing case, the UP actively reports usage information corresponding to all UP reporting policy IDs corresponding to the quota to the CP. After receiving the information (carrying an ID of the quota, the obtained quota usage information corresponding to the quota, a trigger met by the UP, and the like) reported by the UP, the CP directly generates a charging reporting message CCR. The CCR includes an RG of the quota, quota usage information corresponding to each UP reporting policy ID, information about the control plane entity (for example, a user location or a PLMN identifier), a trigger met by the CP, and a trigger met by the UP, and optionally, may further carry an ID or an address of the UP.

In addition, the CP delivers a request message (for example, a second request message) to the UP, to request to report usage information of the quota. After the UP receives the request message of the CP, charging information has been actively sent to the CP, and therefore, no further information is currently available for reporting, and the UP returns a response (for example, a response message for the second request message) to the CP. The response message does not carry the usage information of the quota but carries an indication that the information has been reported.

According to the solution in this embodiment of the present disclosure, in the architecture in which network control and data flow forwarding are separated, the UP monitors the user plane entity trigger event, and the CP monitors the control plane entity trigger event. With proper interactive arrangement, the method for reporting the charging quota usage information is implemented when both the user plane entity trigger event and the control plane entity trigger event are met.

Figure 8:
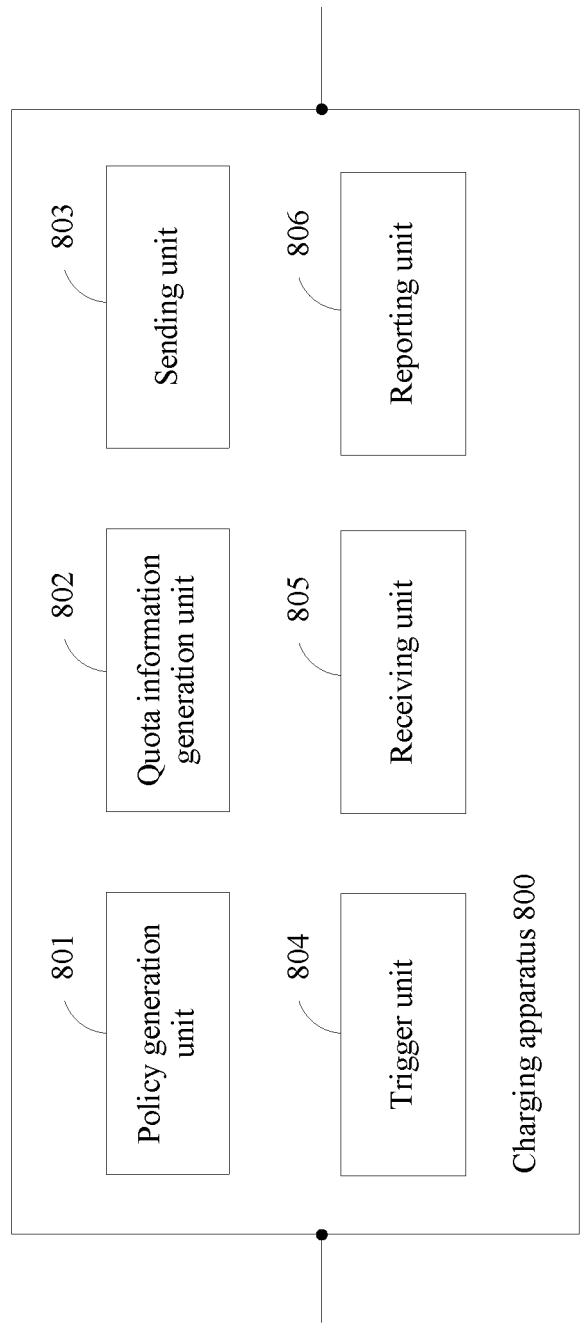
FIG. 8 is a schematic diagram of a charging apparatus 800 according to an embodiment of the present disclosure.

An embodiment of the present disclosure further provides a charging apparatus 800. Referring to FIG. 8, the charging apparatus is applied to a network architecture in which network control and data flow forwarding are separated, and is configured to perform the method for the control plane entity in the foregoing embodiments. The charging apparatus is a control plane CP function apparatus. Referring to FIG. 8, the charging apparatus includes a policy generation unit 801, configured to: execute a charging rule installed or activated by a policy and charging rules function PCRF entity, and generate a user plane UP entity reporting policy based on the charging rule, a quota information generation unit 802, configured to: request, from an online charging system OCS, a quota required by a rating group in the charging rule, receive a quota delivered by the OCS, and generate UP quota information based on the quota, and a sending unit 803, configured to: determine an association relationship between the UP reporting policy and the UP quota information, include, in the UP reporting policy and/or the UP quota information, a parameter that indicates the association relationship, and deliver the UP reporting policy and/or the UP quota information to the UP.

In a case in which charging quota usage information is reported when a control plane entity trigger event is met, as shown in FIG. 8, the charging apparatus 800 further includes a trigger unit 804, configured to: send a first request message to a user plane UP entity after a first charging trigger event is detected on a control plane side, to request the UP to report usage information of a first quota, where the request message carries an identifier of the first quota or a list of UP reporting policy IDs corresponding to the first quota, and the first charging trigger event is corresponding to information about the first quota, a receiving unit 805, configured to receive usage information that is corresponding to the first quota and that is returned by the UP, where the usage information corresponding to the first quota includes the identifier of the first quota, all UP reporting policy IDs corresponding to the first quota, corresponding quota usage information, and a trigger currently met by the UP, and a reporting unit 806, configured to generate, based on the usage information that is of the first quota and that is reported by the UP, a charging reporting message and send the charging reporting message to the OCS.

In a case in which charging quota usage information is reported when a user plane entity trigger event is met, the charging apparatus 800 further includes (not shown in FIG. 8): a receiving unit, configured to: receive quota usage information that is corresponding to a second quota and that is reported by the UP, where the quota usage information corresponding to the second quota is usage information that is corresponding to the second quota corresponding to a second charging trigger event and that is reported to the CP after the UP detects the second charging trigger event on a UP side, and the usage information corresponding to the second quota includes an identifier of the second quota, all UP reporting policy IDs corresponding to the second quota, corresponding quota usage information, and a trigger currently met by the UP.

In a case in which charging quota usage information is reported when both a user plane entity trigger condition and a control plane entity trigger condition are met, the charging apparatus 800 further includes (not shown in FIG. 8) a trigger unit, configured to: detect a third charging trigger event corresponding to a third quota, and send a second request message to the UP to request the UP to report usage information of the third quota, and a receiving unit, configured to receive quota usage information that is corresponding to the third quota and that is reported by the UP, where the quota usage information is quota usage information that is corresponding to the third quota and that is reported to the CP after the UP detects a fourth charging trigger event on the UP side, and the usage information of the third quota includes an identifier of the third quota, all UP reporting policy IDs corresponding to the third quota, and corresponding quota usage information.

The receiving unit is further configured to receive a response message returned by the UP for the second request message, where the response message includes an indication that the requested quota usage information has been reported.

The charging apparatus 800 provided in this embodiment of the present disclosure has a function of the control plane CP. In the architecture in which network control and data flow forwarding are separated, the charging apparatus generates the UP reporting policy based on the charging rule in the charging policy activated by the PCRF, generates the UP quota information based on the quota delivered by the OCS, and delivers the reporting policy and the UP quota information to the UP, thereby implementing interaction between the CP and the UP in the CU-separated architecture. The charging apparatus establishes the association between the UP reporting policy and the UP quota information, thereby implementing online charging credit control and usage information reporting in the CU-separated architecture. In addition, methods for collecting and reporting quota usage information under various different trigger conditions are provided, thereby implementing flexible charging.

Figure 9:
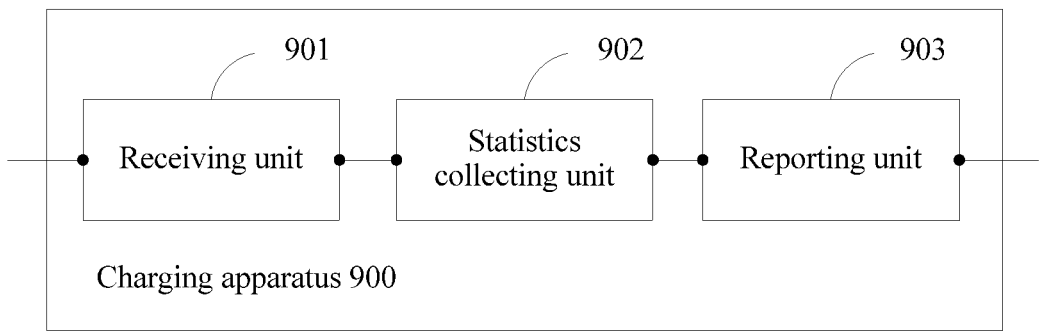
FIG. 9 is a schematic diagram of a charging apparatus 900 according to an embodiment of the present disclosure.

An embodiment of the present disclosure further provides a charging apparatus 900. Referring to FIG. 9, the charging apparatus is applied to a network architecture in which network control and data flow forwarding are separated, and is configured to perform the method for the user plane entity in the foregoing embodiments. The charging apparatus is a UP function apparatus, and is usually close to a gateway device in an access network after CU separation. The charging apparatus includes a receiving unit 901, configured to receive a UP reporting policy and UP quota information that are delivered by a control plane CP function apparatus, a statistics collecting unit 902, configured to collect statistics about quota usage information of the UP based on the UP quota information and the UP reporting policy, and a reporting unit 903, configured to report the statistics-collected UP quota usage information to the CP.

The UP reporting policy includes one or more of the following: the reporting policy ID, a flow feature and/or an application ID in the charging rule, precedence of the UP reporting policy, a CP subscription event, an indication for use of UP quota information, or a used UP quota ID.

The UP quota information includes one or more of the following: a quota ID, a quota type, a quota value, one or more user plane triggers corresponding to a quota, or a corresponding UP reporting policy ID.

The statistics collecting unit 902 is further configured to: match, based on the flow feature and/or the application ID in the UP reporting policy and the precedence of the UP reporting policy, a service data flow corresponding to the flow feature and/or an application, use, for the matched service data flow, the UP quota information corresponding to the UP reporting policy, and separately collect statistics about information of the detected service data flow based on the UP reporting policy.

In a case in which charging quota usage information is reported when a control plane entity trigger event is met, a case in which charging quota usage information is reported when a user plane entity trigger event is met, and a case in which charging quota usage information is reported when both a user plane entity trigger event and a control plane entity trigger event are met, for a function of the charging apparatus 900, refer to the descriptions related to the UP function entity in the foregoing embodiments. Details are not described herein again.

The charging apparatus 900 provided in this embodiment of the present disclosure has a function of the user plane UP function. In the architecture in which network control and data flow forwarding are separated, the charging apparatus receives the UP reporting policy and the UP quota information that are delivered by the control plane CP function apparatus, collects statistics about the quota usage information and the service data flow information based on the UP quota information and the UP reporting policy, and reports, to the CP, the statistics-collected quota usage information of the UP reporting policy ID. In this way, online charging credit control and usage information reporting are implemented in the CU-separated architecture.

Figure 10:
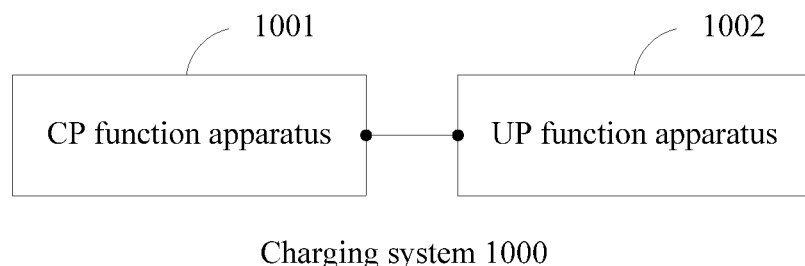
FIG. 10 is a schematic diagram of a charging system 1000 according to an embodiment of the present disclosure.

An embodiment of the present disclosure further provides a charging system 1000. Referring to FIG. 10, the charging system is applied to a network architecture in which network control and data flow forwarding are separated, and is used to perform all the foregoing method embodiments. The charging system includes a control plane CP function apparatus 1001 (corresponding to the charging apparatus 800 in the foregoing apparatus embodiment) and a user plane UP function apparatus 1002 (corresponding to the charging apparatus 900 in the foregoing apparatus embodiment). The CP function apparatus 1001 is configured to: execute a charging rule installed or activated by a policy and charging rules function PCRF entity, generate a user plane UP entity reporting policy based on the charging rule, request a required quota from an online charging system OCS based on the charging rule, receive a quota delivered by the OCS, generate UP quota information based on the quota, determine an association relationship between the UP reporting policy and the UP quota information, included, in the UP reporting policy and/or the UP quota information, a parameter that indicates the association relationship, and deliver the UP reporting policy and/or the UP quota information to the UP function apparatus.

The user plane UP function apparatus 1002 is configured to interact with the CP function apparatus and is configured to: receive the UP reporting policy and the UP quota information that are delivered by the CP function apparatus, collect statistics about quota usage information of the UP based on the UP quota information and the UP reporting policy, and report, to the CP function apparatus, the statistics-collected UP quota usage information.

According to the charging system 1000 provided in this embodiment of the present disclosure, in the architecture in which network control and data flow forwarding are separated, with work division and interaction between the CP function apparatus and the UP function apparatus, online charging credit control and usage information reporting are implemented in the architecture in which the CP and the UP are separated.

Figure 11:
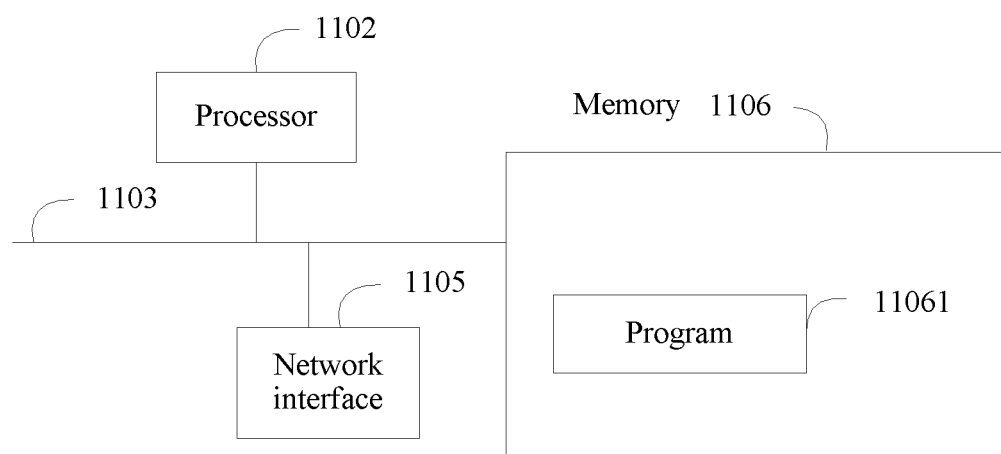
FIG. 11 is a schematic diagram of a charging apparatus according to an embodiment of the present disclosure.

FIG. 11 describes a structure or an implementation of a charging apparatus 1100 provided in an embodiment of the present disclosure. The charging apparatus may be configured to perform all the foregoing method embodiments. The charging apparatus 1100 includes: at least one processor 1101 (for example, a CPU), at least one network interface 1105 or another communications interface, a memory 1106, and at least one communications bus 1103 that is configured to implement connection and communication between these units. The processor 1102 is configured to perform an executable module stored in the memory 1106, for example, a computer program. The memory 1106 may include a high-speed random access memory (RAM, Random Access Memory), or may include a non-volatile memory (non-volatile memory), for example, at least one disk memory. Communication and connection between a gateway in the system and at least one of other network elements are implemented by using the at least one network interface 1105 (which may be wired or wireless), for example, by using the Internet, a wide area network, a local area network, or a metropolitan area network.

In some implementations, the memory 1106 stores a program 11061, and the program 11061 may be executed by the processor 1102. The program includes executing, by a control plane CP entity, a charging rule installed or activated by a policy and charging rules function PCRF entity, generating, by the CP, a user plane UP entity reporting policy based on the charging rule, requesting, by the CP, a required quota from an online charging system OCS based on the charging rule, receiving, by the CP, a quota delivered by the OCS, and generating UP quota information based on the quota, and establishing, by the CP, an association relationship between the UP reporting policy and the UP quota information, including, in the UP reporting policy and/or the UP quota information, a parameter that indicates the association relationship, and delivering the UP reporting policy and/or the UP quota information to the UP.

Alternatively, the program includes receiving, by a user plane UP entity, a UP reporting policy and UP quota information that are delivered by a control plane CP entity, collecting, by the UP, statistics about quota usage information of the UP based on the UP quota information and the UP reporting policy, and reporting, by the UP, the quota usage information of the UP to the CP.

Content such as information exchange and an execution process between the units or modules in the apparatus and the system is based on a same idea as the method embodiments 1 to 4 of the present disclosure. Therefore, for detailed content, refer to descriptions in the method embodiments of the present disclosure, and details are not described herein again.

A person of ordinary skill in the art may understand that all or some of the processes of the methods in some embodiments may be implemented by a computer program instructing relevant hardware. The program may be stored in a computer readable storage medium. When the program runs, the processes of the methods in some embodiments are performed. The foregoing storage medium may include: a magnetic disk, an optical disc, a read-only memory (ROM, read-only memory), or a random access memory (RAM, random access memory).

Specific embodiments are used in this specification to describe the principle and implementations of the present disclosure. The foregoing embodiments are merely intended to help understand the method and idea of the present disclosure. In addition, with respect to the implementations and the application scope, modifications may be made by a person of ordinary skill in the art based on the idea of the present disclosure. Therefore, content of the specification shall not be construed as a limitation on the present disclosure.

What is claimed is:

1. A charging method, applied to a network architecture in which network control and data flow forwarding are separated, wherein the method comprises:
   executing, by a control plane (CP) entity, a charging rule installed or activated by a policy and charging rules function entity;
   requesting, by the CP entity, a required quota from an online charging system based on the charging rule;
   receiving, by the CP entity, a quota delivered by the online charging system, and generating user plane (UP) quota information according to the quota delivered by the online charging system; and
   generating, by the CP entity, a UP reporting policy according to the charging rule
   delivering, by the CP entity, the UP reporting policy and/or the UP quota information to the UP entity, wherein the UP reporting policy includes a parameter that indicates an association relationship between the UP reporting policy and the UP quota information.

2. The method according to claim 1,
   wherein the parameter that indicates the association relationship is a UP quota identifier (ID).

3. The method according to claim 1, wherein the generating, by the CP entity, a UP reporting policy comprises:
   generating, by the CP entity, a corresponding UP reporting policy for the charging rule, wherein the UP reporting policy comprises one or more of the following: a reporting policy ID, a flow feature, an application ID in the charging rule, precedence of the UP reporting policy, a CP subscription event, an indication for use of UP quota information, or a UP quota ID; and saving, by the CP entity, a correspondence between the charging rule and the UP reporting policy.

4. The method according to claim 1,
wherein the UP quota information comprises one or more of the following:
a UP quota identifier (ID), a quota type, a quota value, one or more user plane triggers; and
wherein the method further comprises saving, by the CP entity, a correspondence between a UP quota ID and the quota delivered by the online charging system.

5. The method according to claim 4, wherein the method further comprises:
receiving, by the CP entity, quota usage information reported by the UP entity; and
generating a charging report message according to the correspondence between the UP quota identifier (ID) and the quota delivered by the online charging system, wherein the charging report message comprises a rating group of the quota, quota usage information, information about the control plane entity, a trigger met by the CP entity, and/or a trigger met by the UP.

6. The method according to claim 1, wherein the quota delivered by the online charging system comprises at least one of a time division point or an event division point, and wherein the UP quota information further comprises one or more statistics collection division points, so that the UP entity can differentially use the quota, collect statistics about usage information, and report the usage information, based on the at least one of the time division point or the event division point.

7. The method according to claim 1, wherein the quota delivered by the online charging system is a quota pool, and the generating, by the CP entity, the UP quota information comprises:
generating, by the CP entity, the UP quota information for all rating groups in the quota pool.

8. The method according to claim 1, wherein the delivering, by the CP entity, the UP reporting policy and/or the UP quota information to the UP entity comprises performing at least one of the following:
separately delivering, by the CP entity, the UP reporting policy or the UP quota information to the UP entity; or
simultaneously delivering, by the CP entity, the UP reporting policy and the UP quota information to the UP entity.

9. The method according to claim 1, wherein the method further comprises performing, before the receiving the quota delivered by the online charging system:
determining, by the CP entity based on a Credit Control Answer (CCA) returned by the online charging system, whether to deliver quota information to the UP entity, and wherein the determining whether to deliver the quota information to the UP entity comprises at least one of the following:
not delivering the quota information to the UP entity in response to the quota delivered by the online charging system being 0, or an error message included in the CCA or
not delivering the quota information to the UP entity in response to the CP entity managing usage of the quota.

10. The method according to claim 1, wherein before requesting a required quota from an online charging system based on the charging rule, the method further comprises:
determining, by the CP entity, there is no available quota for a rating group in the charging rule.

11. The method according to claim 1, further comprising:
detecting, by the CP entity, a charging trigger event on a CP side;
sending, by the CP entity, a first request message to the UP entity, wherein the first request message carries an identifier (ID) of the quota; and
receiving, by the CP entity, the ID of the quota, the usage information of the quota, and a trigger currently met by the UP.

12. The method according to claim 1, further comprising:
receiving, by the CP entity, from the UP entity, an identifier (ID) of a quota corresponding to a charging trigger event that is detected by the UP entity, usage information of the quota, and a trigger currently met by the UP entity.

13. The method according to claim 1, further comprising:
detecting, by the CP entity, a charging trigger event;
sending a request message to the UP entity to request the UP entity to report usage information of a quota corresponding to the charging trigger event detected by the CP entity; and
receiving, by the CP entity, a response message returned by the UP entity in response to the request message, wherein the response message comprises an indication that the usage information of the quota has been reported.

14. A charging method, applied to a network architecture in which network control and data flow forwarding are separated, wherein the method comprises:
receiving, by a user plane (UP) entity, a UP reporting policy and UP quota information that are delivered by a control plane (CP) entity, wherein the UP reporting policy includes a parameter that indicates an association relationship between the UP reporting policy and the UP quota information;
collecting, by the UP entity, statistics about quota usage information according to the UP quota information and the UP reporting policy; and
reporting, by the UP entity, the quota usage information to the CP entity.

15. The method according to claim 14, wherein the UP reporting policy comprises one or more of the following: a reporting policy identifier (ID), a flow feature, an application ID in a charging rule, precedence of the UP reporting policy, a CP subscription event, an indication for use of UP quota information, or a first UP quota ID;
wherein the UP quota information comprises one or more of the following: a second UP quota ID, a quota type, a quota value, or one or more user plane triggers; and
wherein the collecting the statistics about the quota usage information comprises:
monitoring, by the UP entity, according to the flow feature and/or the application ID in the UP reporting policy and the precedence of the UP reporting policy, a service data flow corresponding to the flow feature and/or the application;
using, for the monitored service data flow, the UP quota information corresponding to the UP reporting policy; and
collecting statistics about information of the monitored service data flow based on the UP reporting policy.

16. The method according to claim 15, wherein the method further comprises:
- receiving, by the UP entity, an update message that is delivered by the CP entity for updating the UP reporting policy;
- monitoring, based on the updated UP reporting policy, a service data flow corresponding to the flow feature and/or the application;
- using, for the monitored service data flow, UP quota information corresponding to the updated UP reporting policy; and
- collecting statistics about information of the monitored service data flow based on the updated UP reporting policy.

17. The method according to claim 15, wherein the method further comprises:
- determining, by the UP based on the UP quota ID in the UP reporting policy, that the UP reporting policy is used for online charging.

18. The method according to claim 14, wherein the parameter that indicates the association relationship between the UP reporting policy and the UP quota information is a UP quota identifier (ID).

19. The method according to claim 14, wherein the method further comprises:
- collecting, by the UP entity, in response to the UP quota information having one or more statistics collection division points, statistics about information of service data flows before each of the statistics collection division points and statistics about information of service data flows after each of the statistics collection division points.

20. The method according to claim 14, wherein the reporting, by the UP entity, the quota usage information to the CP entity specifically comprises:
- receiving, by the UP entity, a request message delivered by the CP entity, wherein the request message carries an identifier (ID) of the quota corresponding to a charging trigger event detected by the CP entity on a CP side; and
- returning, by the UP entity, to the CP entity, the ID of the quota, the usage information of the quota.

21. The method according to claim 14, wherein the reporting the quota usage information to the CP entity comprises:
- reporting, by the UP entity, to the CP entity, an identifier of a quota corresponding to a charging trigger event detected by the UP entity on a UP side, and usage information of the quota.

22. The method according to claim 14, wherein the reporting the quota usage information to the CP entity comprises:
- reporting, by the UP entity, to the CP entity, an identifier of a quota corresponding to a charging trigger event detected by the UP entity on a UP side, and usage information of the quota;
- receiving, by the UP entity, a request message sent by the CP entity, requesting that the UP entity reports the usage information of the quota; and
- returning, by the UP entity, a response message for the request message to the CP entity, wherein the response message comprises an indication that the requested usage information of the quota has been reported.

23. A charging system, comprising
a user plane (UP) function apparatus in a network architecture in which network control and data flow forwarding are separated; and
a control plane (CP) function apparatus in the network architecture and configured to:
- execute a charging rule installed or activated by a policy and charging rules function entity;
- request a required quota from an online charging system based on the charging rule;
- receive a quota delivered by the online charging system, generate user plane (UP) quota information based on the quota;
- generate a UP entity reporting policy based on the charging rule; and
- deliver the UP reporting policy and the UP quota information to the UP function apparatus, wherein the UP reporting policy includes a parameter that indicates an association relationship between the UP reporting policy and the UP quota information;

wherein the UP function apparatus is configured to interact with the CP function apparatus and is configured to:
receive the UP reporting policy and the UP quota information that are delivered by the CP function apparatus;
collect statistics about quota usage information according to the UP quota information and the UP reporting policy; and
report, to the CP function apparatus, the quota usage information.

24. A charging apparatus, comprising:
a processor; and
a memory, wherein the memory stores an application program code, and wherein the processor is configured to execute the application program code to:
- execute a charging rule installed or activated by a policy and charging rules function entity;
- request a required quota from an online charging system based on the charging rule;
- receive a quota delivered by the online charging system, and generating user plane (UP) quota information according to the quota delivered by the online charging system;
- generate a UP reporting policy according to the charging rule; and
- deliver the UP reporting policy and/or the UP quota information to the UP entity, wherein the UP reporting policy includes a parameter that indicates an association relationship between the UP reporting policy and the UP quota information.

25. A charging apparatus, comprising:
a processor; and
a memory, wherein the memory is configured to store an application program code, and wherein the processor is configured to execute the application program code to:
- receive a UP reporting policy and UP quota information that are delivered by a control plane (CP) entity; and wherein the UP reporting policy includes a parameter that indicates an association relationship between the UP reporting policy and the UP quota information;
- collect statistics about quota usage information according to the UP quota information and the UP reporting policy; and
- report the quota usage information to the CP entity.

* * * * *

UNITED STATES PATENT AND TRADEMARK OFFICE
CERTIFICATE OF CORRECTION

PATENT NO. : 10,609,225 B2
APPLICATION NO. : 16/352685
DATED : March 31, 2020
INVENTOR(S) : Xiaoqian Chai It is certified that error appears in the above-identified patent and that said Letters Patent is hereby corrected as shown below:

In the Claims

In Column 26, Line 53, Claim 1, delete "online charging system; and" and insert --online charging system;--.

In Column 26, Line 55, Claim 1, delete "to the charging rule" and insert --to the charging rule; and--.

In Column 26, Line 57, Claim 1, delete "the UP entity," and insert --a UP entity,--.

In Column 27, Line 14, Claim 4, delete "a UP quota ID" and insert --the UP quota ID--.

In Column 27, Line 27, Claim 5, delete "by the UP" and insert --by the UP entity--.

In Column 30, Line 14, Claim 23, delete "entity".

In Column 30, Line 39, Claim 24, delete "generating" and insert --generate--.

In Column 30, Line 45, Claim 24, delete "the UP entity" and insert --a UP entity--.

Signed and Sealed this
Seventh Day of July, 2020

Andrei Iancu
*Director of the United States Patent and Trademark Office*